US010664500B2

(12) United States Patent
Chang et al.

(10) Patent No.: US 10,664,500 B2
(45) Date of Patent: May 26, 2020

(54) SYSTEM AND METHOD FOR USER-BEHAVIOR BASED CONTENT RECOMMENDATIONS

(71) Applicant: Futurewei Technologies, Inc., Plano, TX (US)

(72) Inventors: E-Cheng Chang, San Diego, CA (US); Yuning Huang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 332 days.

(21) Appl. No.: 14/982,842

(22) Filed: Dec. 29, 2015

(65) Prior Publication Data

US 2017/0185669 A1 Jun. 29, 2017

(51) Int. Cl.
| | |
|---|---|
| *G06F 16/28* | (2019.01) |
| *G06F 16/435* | (2019.01) |
| *G06F 16/683* | (2019.01) |
| *G06F 16/583* | (2019.01) |
| *G06F 16/2457* | (2019.01) |
| *G06F 16/9032* | (2019.01) |
| *G06F 16/438* | (2019.01) |

(52) U.S. Cl.
CPC ...... *G06F 16/287* (2019.01); *G06F 16/24578* (2019.01); *G06F 16/288* (2019.01); *G06F 16/437* (2019.01); *G06F 16/438* (2019.01); *G06F 16/5854* (2019.01); *G06F 16/683* (2019.01); *G06F 16/90324* (2019.01)

(58) Field of Classification Search
USPC ........................................................ 707/740
See application file for complete search history.

(56) References Cited

U.S. PATENT DOCUMENTS

| | | | |
|---|---|---|---|
| 6,585,521 | B1 | 7/2003 | Obrador |
| 7,258,275 | B1 * | 8/2007 | Reddy .................... G07C 13/00 |
| | | | 235/384 |
| 8,810,684 | B2 | 8/2014 | Chang |
| | | (Continued) | |

FOREIGN PATENT DOCUMENTS

| | | |
|---|---|---|
| CN | 102779179 A | 11/2012 |
| CN | 103455485 A | 12/2013 |
| | (Continued) | |

OTHER PUBLICATIONS

Apple ProPhoto, Aperture 3 User Manual. "An Overview of Faces," https://documentation.apple.com/en/aperture/usermanual/index. html#chapter=12%26section=1%26tasks=true, 2012, 3 pages.

(Continued)

*Primary Examiner* — Muluemebet Gurmu
(74) *Attorney, Agent, or Firm* — Slater Matsil, LLP

(57) ABSTRACT

A system and method of predicting a user's most meaningful multimedia content includes enabling a sensing device on a user device in response to a user requesting a multimedia operation, performing the multimedia operation for a multimedia content, in response to the multimedia operation, identifying behavioral and interaction cues of the user with the sensing device substantially when the multimedia operation is being performed, updating a recommendation from a set of multimedia content including the multimedia content represented by the behavioral and interaction cues identified, and presenting the updated recommendation to the user.

24 Claims, 18 Drawing Sheets

(56) References Cited

U.S. PATENT DOCUMENTS

| | | | |
|---|---|---|---|
| 2002/0180803 A1* | 1/2002 | Kaplan et al. | G06F 17/30 707/E17.009 |
| 2003/0118974 A1 | 6/2003 | Obrador | |
| 2005/0268279 A1* | 12/2005 | Paulsen et al. | G06F 8/38 717/110 |
| 2006/0238517 A1* | 10/2006 | King | G06F 1/1626 345/173 |
| 2006/0259355 A1 | 11/2006 | Farouki et al. | |
| 2007/0168413 A1* | 7/2007 | Barletta et al. | G06F 15/16 707/E17.009 |
| 2007/0189544 A1* | 8/2007 | Rosenberg | G11B 27/105 381/57 |
| 2008/0288982 A1 | 11/2008 | Pronk et al. | |
| 2011/0050954 A1 | 3/2011 | Prentice | |
| 2011/0106630 A1* | 5/2011 | Hegeman | G06Q 30/02 705/14.71 |
| 2012/0188405 A1 | 7/2012 | Morrison et al. | |
| 2012/0316934 A1 | 12/2012 | Zier et al. | |
| 2013/0204825 A1* | 8/2013 | Su | G06N 5/04 706/46 |
| 2013/0243270 A1 | 9/2013 | Kamhi et al. | |
| 2014/0122502 A1 | 5/2014 | Kalmes et al. | |
| 2014/0181123 A1 | 6/2014 | Tuffet Blaise et al. | |
| 2014/0212854 A1* | 7/2014 | Divakaran | G09B 19/00 434/236 |
| 2014/0258027 A1 | 9/2014 | Veugen | |
| 2014/0270683 A1 | 9/2014 | Zhu et al. | |
| 2015/0026209 A1 | 1/2015 | Xiang | |
| 2015/0066922 A1* | 3/2015 | Xiong | G06F 17/30038 707/736 |
| 2015/0347416 A1 | 12/2015 | Lin et al. | |

FOREIGN PATENT DOCUMENTS

| | | |
|---|---|---|
| CN | 103761286 A | 4/2014 |
| CN | 103902640 A | 7/2014 |
| CN | 104424270 A | 3/2015 |
| CN | 104462468 A | 3/2015 |
| JP | 2011096173 A | 5/2011 |
| JP | 2013503382 A | 1/2013 |
| RU | 2420908 C2 | 6/2011 |
| RU | 2539585 C2 | 1/2015 |
| WO | 2015094589 A1 | 6/2015 |

OTHER PUBLICATIONS

Google Photos App., www.google.com/photos/about, released at Google I/O Conference, Jun. 2015, 5 pages.

PicJoy Photo Organization App., www.picjoyapp.com, 2015, 3 pages.

Stern, J. "Google Photos Review: Why Google Beats Apple at Organizing Your Life's Memories," The Wall Street Journal, http://www.wsj.com/articles/google-photos-review-why-google-beats-apple-at-organizing-your-lifes-memories-1433266299, Jun. 2, 2015, 7 pages.

Yang, Dongfang et al., "Application and Research of Mathematical Models in Ecology," (Abstract Only) Ocean Press, Nov. 1, 2013, 2 pages.

* cited by examiner

SYSTEM AND METHOD FOR USER-BEHAVIOR BASED CONTENT RECOMMENDATIONS

TECHNICAL FIELD

The present invention relates generally to managing multimedia content, and in particular embodiments, to techniques and mechanisms for predicting a user's most meaningful multimedia content.

BACKGROUND

With the decrease of storage costs, user equipment (UE) is now capable of storing vast quantities of multimedia content (e.g., photographs, videos, music). As a result, organization of multimedia on UEs has recently become a difficult task. Users must often sort through hundreds or thousands of multimedia files to locate a single file that they wish to consume.

Several approaches to assisting a user in locating multimedia have been proposed. Traditional image searching and understanding approaches attempt to locate objects in multimedia content. For example, objects such as faces, landmarks, animals, etc., may be located in multimedia content, and the multimedia content may then be grouped according to the objects recognized. Other approaches may also consider metadata of the multimedia content, such as the time and location of capture.

Unfortunately, multimedia contents are usually grouped and organized loosely using traditional approaches. Most users still need to search for content they wish to consume. Further, traditional approaches often require vast amounts of processing and storage capacity to analyze multimedia content.

SUMMARY OF THE INVENTION

Technical advantages are generally achieved, by embodiments of this disclosure which describe a system and method for predicting a user's most meaningful multimedia content.

In accordance with an embodiment, a method is provided. The method includes enabling an input device in response to a user requesting a multimedia operation, recording behavioral and interaction cues of the user with the input device while performing the multimedia operation, ranking the behavioral and interaction cues in accordance with a model to produce a first multimedia recommendation criterion for a user, and recommending a plurality of multimedia files to the user in accordance with the first multimedia recommendation criterion.

In accordance with another embodiment, a method is provided. The method includes enabling a front camera of a device in response to a user viewing a multimedia file, recording behavioral and interactive actions of the user with the front camera, analyzing the behavioral and interactive actions to produce multimedia cues, assigning weights to each of the multimedia cues, adjusting the weights for each of the multimedia cues in accordance with the behavioral and interactive actions of the user, and generating image scores for a plurality of multimedia files in accordance with the weights.

In accordance with yet another embodiment, a device is provided. The device includes an input device, a processor, and a computer-readable storage medium storing a program including instructions executable by the processor, the processor, when executing the instructions, configured to perform a method comprising enabling the input device in response to a user viewing a multimedia file, recording behavioral and interaction cues of the user with the input device while displaying the multimedia file, ranking the behavioral and interaction cues in accordance with a model to produce a first multimedia recommendation criterion for a user, and recommending a plurality of multimedia files to the user in accordance with the first multimedia recommendation criterion.

In accordance with yet another embodiment, a device is provided. The device includes a sensing device, a memory storing a plurality of multimedia content, a processor, and a computer-readable storage medium storing a program to be executed by the processor. The program includes instructions for receiving a request from a user to perform a multimedia operation, performing the multimedia operation while retrieving data with the sensing device, updating a recommendation of a subset of the multimedia content in accordance with the request and the retrieved data, and presenting the updated recommendation to the user.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Disclosed herein is a system and method for predicting a user's most meaningful multimedia content. With the proliferation of low-cost storage, user devices can now store thousands of photographs, videos, and songs. It can be difficult for users to find their most meaningful multimedia in these vast collections of content. Techniques to locally and automatically provide meaningful content to users are thus desired.

Embodiments provide systems and methods for automatically predicting and suggesting (or identifying, recommending etc.) meaningful or relevant multimedia to specific users of devices. Behavioral and interactive inputs of a user are captured with a sensor and analyzed for cues as the user views or captures multimedia with a user device. These inputs are analyzed for cues so that a user device may learn which multimedia is most meaningful to a user. The behavioral and interactive inputs from the user may also be combined with a traditional detect-recognize-classify scheme to further refine prediction and recommendation of multimedia content to a user. Capture of behavioral and interactive inputs and analysis for cues is possible because modern user devices often have multiple sensors, such as front and rear cameras and microphones, integrated into them.

Various embodiments may achieve advantages. Automatically predicting and suggesting meaningful multimedia to a user allows the user to save and easily access their favorite content on a user device. For example, a collection containing thousands of multimedia files may be narrowed down to a recommendation of only several dozen favorite multimedia files that are meaningful to a user. Feedback from the user on these recommendations may be used as machine learning inputs for the user device, allowing further refinement of multimedia recommendations. User devices may thus be more personalized to specific users' preferences. Such a learning approach may be implemented in a more relatively simple manner than traditional detect-recognize-classify approaches, allowing for local implementation on user devices and avoiding dependence on cloud computing for processing or storage capacity.

Figure 1A:
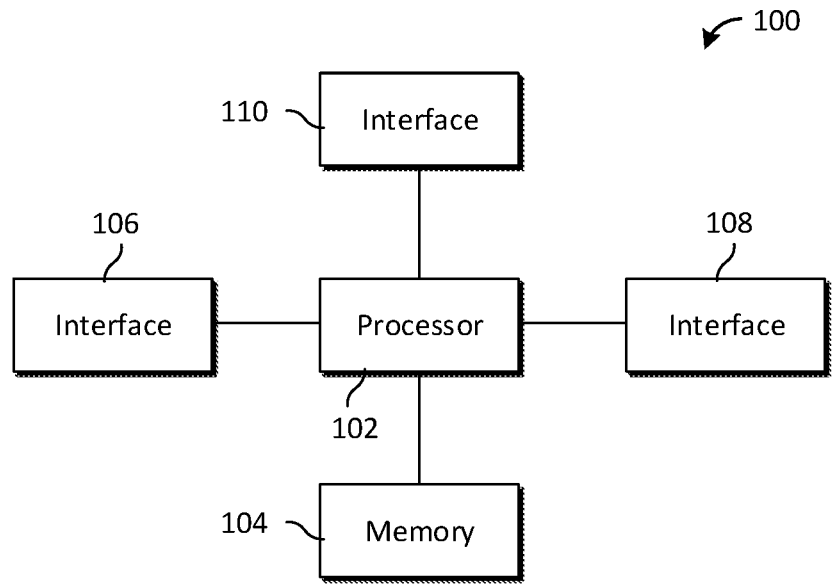
FIG. 1A illustrates a block diagram illustrating an exemplary processing system.

FIG. 1A illustrates a block diagram of an embodiment processing system 100 for performing methods described herein, which may be installed in a host device. As shown, the processing system 100 includes a processor 102, a memory 104, and interfaces 106-110, which may (or may not) be arranged as shown in FIG. 1. The processor 102 may be any component or collection of components adapted to perform computations and/or other processing related tasks, and the memory 104 may be any component or collection of components adapted to store programming and/or instructions for execution by the processor 102. In an embodiment, the memory 104 includes a non-transitory computer readable medium. The interfaces 106, 108, 110 may be any component or collection of components that allow the processing system 100 to communicate with other devices/components and/or a user. For example, one or more of the interfaces 106, 108, 110 may be adapted to communicate data, control, or management messages from the processor 102 to applications installed on the host device and/or a remote device. As another example, one or more of the interfaces 106, 108, 110 may be adapted to allow a user or user device (e.g., personal computer (PC), etc.) to interact/communicate with the processing system 100. The processing system 100 may include additional components not depicted in FIG. 1, such as long term storage (e.g., non-volatile memory, etc.).

Figure 1B:
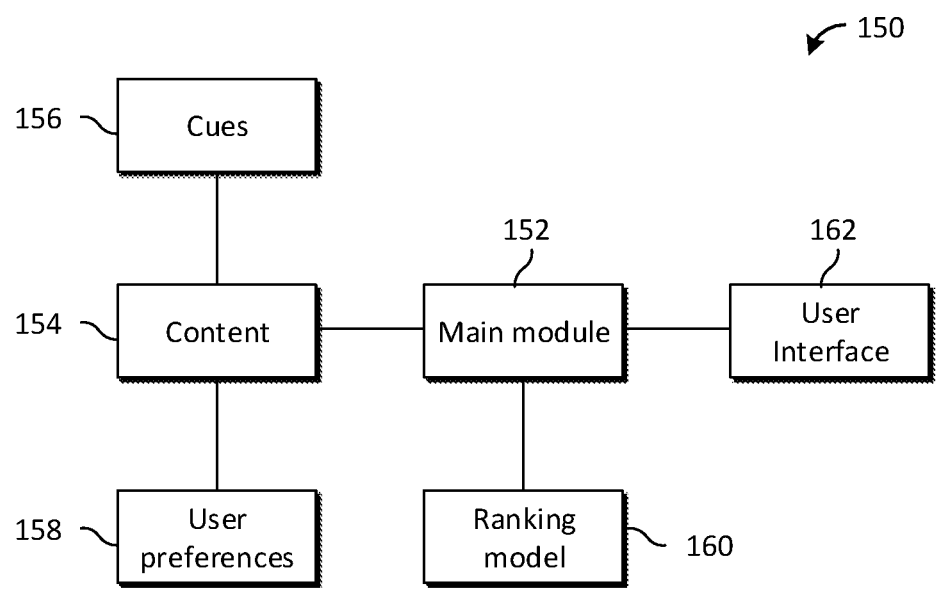
FIG. 1B illustrates a block diagram illustrating an exemplary recommendation system.

FIG. 1B illustrates block diagram of an embodiment multimedia recommendation system 150. The multimedia recommendation system 150 includes a main module 152, a content store 154, a cue store 156, a user preferences store 158, a ranking model (or recommendation engine) 160, and a user interface 162. The main module 152 performs ranking of multimedia content stored in the content store 154 with the ranking model 160, and presents the multimedia content to a user through the user interface 162. The main module 152 may be coupled to a sensor controller, to receive sensing data and/or control (start, stop, open, close etc.) attached sensor devices.

Multimedia content may be ranked according to cues associated with the multimedia content, and according to user preferences. The cues may be stored in the cue store 156 and associated with multimedia content in the content store 154. For example, elements or features representing the cues associated with a multimedia content (e.g. a picture or a video) may be generated in response to (or substantially when) making the associated multimedia content (e.g. when taking the picture via a camera or while shooting the video via a video recorder or camera), before the associated multimedia content is fully generated. In some embodiments, the content store 154, the cue store 156, and the user preferences store 158 may all be co-located in the same store, such as a database. The ranking model 160 may be periodically updated according to the cues and user preferences.

Figure 2:
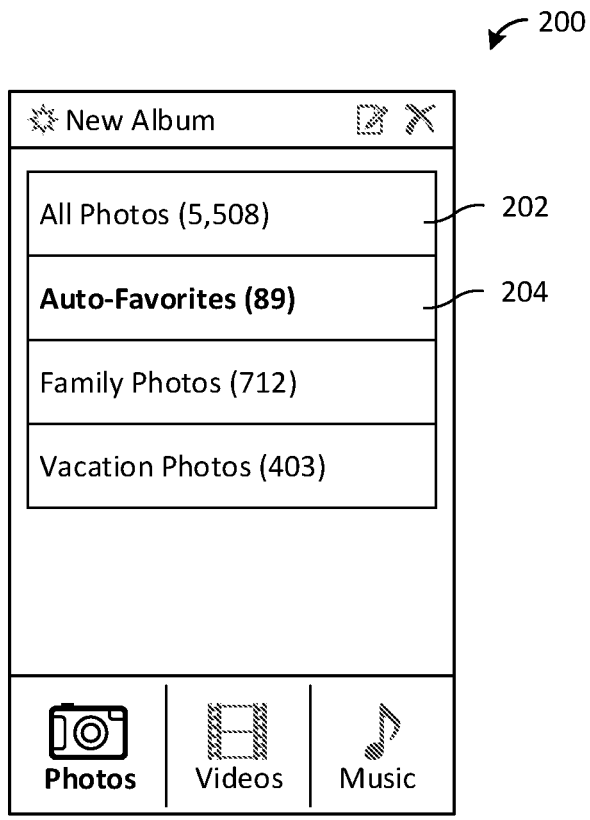
FIG. 2 illustrates an exemplary user interface including a multimedia gallery.

FIG. 2 illustrates an embodiment multimedia gallery 200. The multimedia gallery 200 displays photos, videos, and music. The multimedia gallery 200 is divided into several views, and includes an all photos view 202 and auto-favorites view 204. The all photos view 202 contains all photos that a user has captured with a device. While the multimedia gallery 200 illustrates four views for photos, it should be appreciated that the multimedia gallery 200 may contain other views and be capable of displaying and automatically recommending many types of multimedia content.

The auto-favorites view 204 contains photographs that the multimedia gallery 200 recommends to a user as meaningful content based on behavioral and interactive inputs from the user. As such, the all photos view 202 generally contains more photos than the auto-favorites view 204. For example, in the illustrated embodiment, the multimedia gallery 200 has 5,508 photos in the all photos view 202, but only 89 of those photos have been automatically recommended to the user in the auto-favorites view 204. While the multimedia gallery 200 is illustrated as an application on a mobile user device, it should be appreciated that the multimedia gallery 200 and methods performed thereon could be integrated into a wide variety of products, such as smartphones, tablets, cameras, and photo management software.

The auto-favorites view 204 may be populated by analyzing behavioral and interactive inputs of a user for cues. Behavior cues such as the user's facial expressions or gaze may be analyzed while the user views or captures multimedia. For example, detecting a smile or a frown in the user's facial expression while they view a multimedia file may provide an important cue indicating that the multimedia file is meaningful to the user. Likewise, a user's gaze may be analyzed as they view multimedia content, to determine "hot spots," e.g., favorite people or objects, in the photos.

Interactive cues of the user may also be analyzed as they view multimedia content. For example, the total amount of time a user spends viewing particular multimedia content may be tallied and analyzed to determine if that multimedia content is meaningful. Other interactive metrics may also be considered and analyzed for sub-cues. Such metrics may include determinations of whether the user has shared, edited, zoomed, or oriented the multimedia content.

Environmental or situational inputs of the user may also be analyzed for cues as they capture multimedia, e.g., take a photo or video. Analyzing for environmental cues may include capturing and recognizing voices and background noise, to identify events occurring while taking the photo or video. For example, detection of a birthday song in the background while the user takes a photo may be an environmental cue indicating that the photo will be relatively more meaningful to the user. Facial recognition may also be used, to detect photo or video subjects that the user knows. For example, facial recognition of a captured photo may be performed and then matched against profile pictures in the user's contact list or address book. In such an example, detecting the presence of a close family member in a photo may be an environmental cue that more strongly indicates the photo is meaningful to the user.

The multimedia gallery 200 may also support multiple users, so that meaningful multimedia may be recommended to particular users. For example, a user operating the multimedia gallery 200 may be detected and the auto-favorites view 204 populated with recommendation personalized to that user. Users may be detected, e.g., with facial or voice recognition when they operate the multimedia gallery 200.

Figure 3:
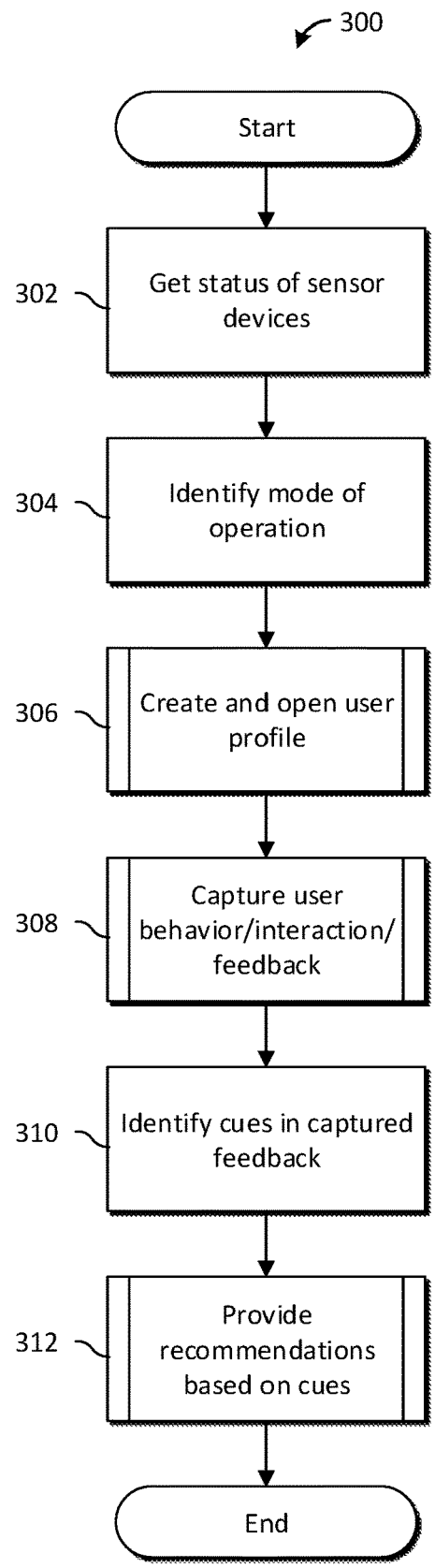
FIG. 3 illustrates an exemplary process to perform multimedia recommendation operations.

FIG. 3 illustrates an embodiment multimedia recommendation method 300. The multimedia recommendation method 300 may be performed by a device as a user browses or captures multimedia content with the device. For example, the multimedia recommendation method 300 may be performed while the user operates the multimedia gallery 200.

The multimedia recommendation method 300 begins by getting the status of sensor devices on a user device (step 302). In some embodiments, access to sensors on the device may be disabled when the multimedia gallery 200 is being presented. For example, access to a microphone may be disabled on the device. Next, the mode of operation is identified (step 304). The user device could be operating in capture mode, where multimedia content is captured, or could be operating in browsing mode, where multimedia content is viewed. The mode of operation may be selected by the user; for example, the user may choose whether they want to browse or capture multimedia. In some embodiments, the mode of operation may be automatically selected or limited according to the detected status of the sensor devices. For example, access to the front or rear cameras may be disabled on the device. In such embodiments, the mode of operation may be limited to browsing mode. In some embodiments, access to devices may be disabled in certain modes of operation. For example, the user may choose to disable the front camera of the device when in capture mode, but enable the front camera of the device when in browsing mode.

Next, a user profile is created and/or opened (step 306). A profile for the current user may first be created, if one does not exist, before opening it. The user's profile may contain preferences and results of cue analysis that allow multimedia content to be recommended to the user based on criterion that may be meaningful to the user (e.g. according to user feedback received). Accordingly, a recommendation criterion may be constructed for making personalized multimedia recommendations for each user.

Next, behavior, interactions, and/or feedback of the user are captured during a multimedia operation (step 308). A multimedia operation may include interaction with user interfaces (e.g. presenting, selecting, browsing operations) of a multimedia content and/or capturing (e.g., producing or generating) a multimedia content via at least one sensing device, such as camera, microphone, or other applicable sensors. The behavior and interactive inputs may be captured by receiving data from the sensor on the device when the user is capturing or viewing multimedia content, and may also be identified based on the user's interaction with particular multimedia content. The feedback may be captured by presenting multimedia recommendations to the user and prompting them for feedback when the user is viewing multimedia content. The behavior, interactions, and/or feedback may be captured in the background periodically or continuously while the user is capturing or browsing multimedia content. In some embodiments, raw data for the captured behavior, interactions, and/or feedback may be stored and analyzed later. In some embodiments the data may be analyzed in real time.

Next, cues are identified in the captured behavior, interactions, and/or feedback of the user (step 310). Cues may include, for example, indications that the user smiled or frowned when viewing or capturing multimedia content. Behavior and interaction cues are identified within the inputs captured by the sensor on the device. For example, behavior cues may include indications that the user smiled or frowned when viewing or capturing particular multimedia content. Likewise, interaction cues may include indications that the user, e.g., viewed particular multimedia multiple times, shared the multimedia, edited the multimedia, etc. Similarly, feedback cues may include indications that the user agreed or disagreed with multimedia recommendations. While various embodiments have been described with respect to particular types of behavioral and interaction cues, it should be appreciated that a wide variety of cues could be captured and identified.

Finally, multimedia content recommendations are provided to the user in accordance with the identified cues (step 312). The multimedia recommendations may be provided in accordance with a model that is constructed for the user profile and includes the identified cues. The model may be updated with machine-learned feedback as the user operates the device. For example, updating the model may include adjusting the weights of various cues based on usage patterns of the user.

Figure 4:
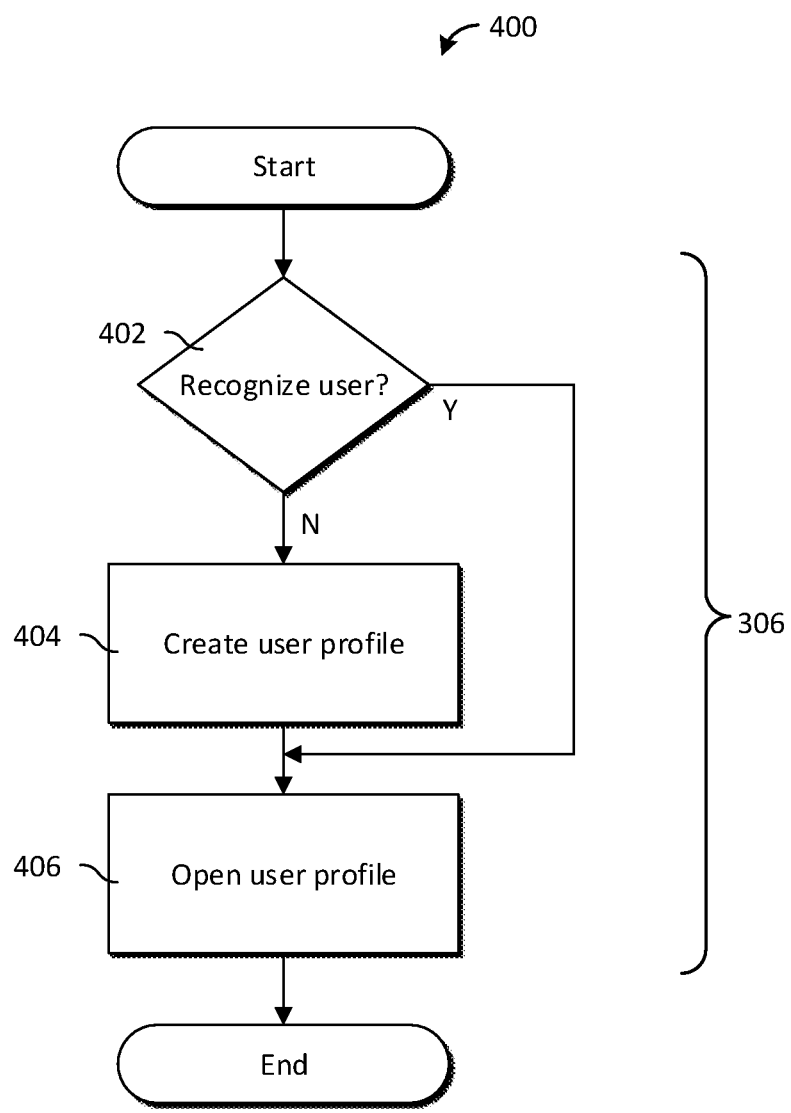
FIG. 4 illustrates an exemplary process to access a user profile.

FIG. 4 illustrates an embodiment user profile access method 400. The user profile access method 400 may be a more detailed illustration of operations occurring when creating or opening a user profile, in step 306 of the multimedia recommendation method 300.

The user profile access method 400 begins by determining whether the user's face is recognizable (step 402). Facial recognition may be used to recognize the user's face and match it against a database of known faces. If a user's face is not recognized, then a new profile is created for the user (step 404). Once the user is recognized or created, the user profile corresponding to the recognized user is opened (step 406). Once a user profile has been opened, the user profile access method 400 concludes.

Figure 5A:
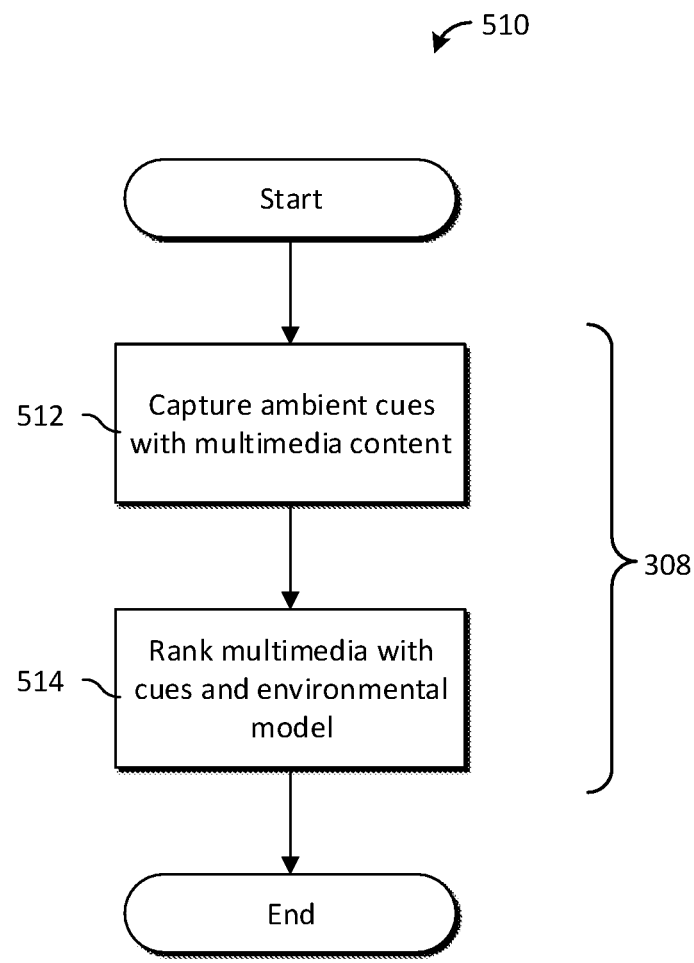
FIGS. 5A-5B illustrate various exemplary processes to identify and record cues representing user behavior, interaction, and feedback.

FIG. 5A illustrates an embodiment behavior and interaction recording method 510. The behavior and interaction recording method 510 may be a more detailed illustration of operations occurring when capturing user behavior, interactions, and feedback, in step 308 of the multimedia recommendation method 300. The behavior and interaction recording method 510 may be performed when the user is capturing multimedia content.

The behavior and interaction recording method 510 begins by capturing ambient cues when capturing multimedia content (step 512). Environment recognition may be performed on the ambient cues, to determine whether or not the captured multimedia content is more likely to be meaningful to a user. For example, if the user is capturing a photo at a birthday party, audio recognition may be used to detect a birthday song in the ambient cues, indicating a relatively higher likelihood that the captured photo will be more meaningful to the user than other photos. Likewise, facial expressions of the user may be captured with the front camera while the user captures a photo with the back camera. Facial recognition of the user's expressions may be performed to detect certain facial expressions of the user, e.g., smiling or laughing. Some facial reactions may indicate a relatively higher likelihood that the captured photo will be more meaningful to the user than other photos.

Once the ambient cues are captured, the multimedia content is ranked according to an environmental model and the cues (step 514). The environmental model may rank and sum the various ambient cues to produce a score for the captured photo or video. Once the multimedia content has been ranked with the ambient cues, the behavior and interaction recording method 510 concludes.

Figure 5B:
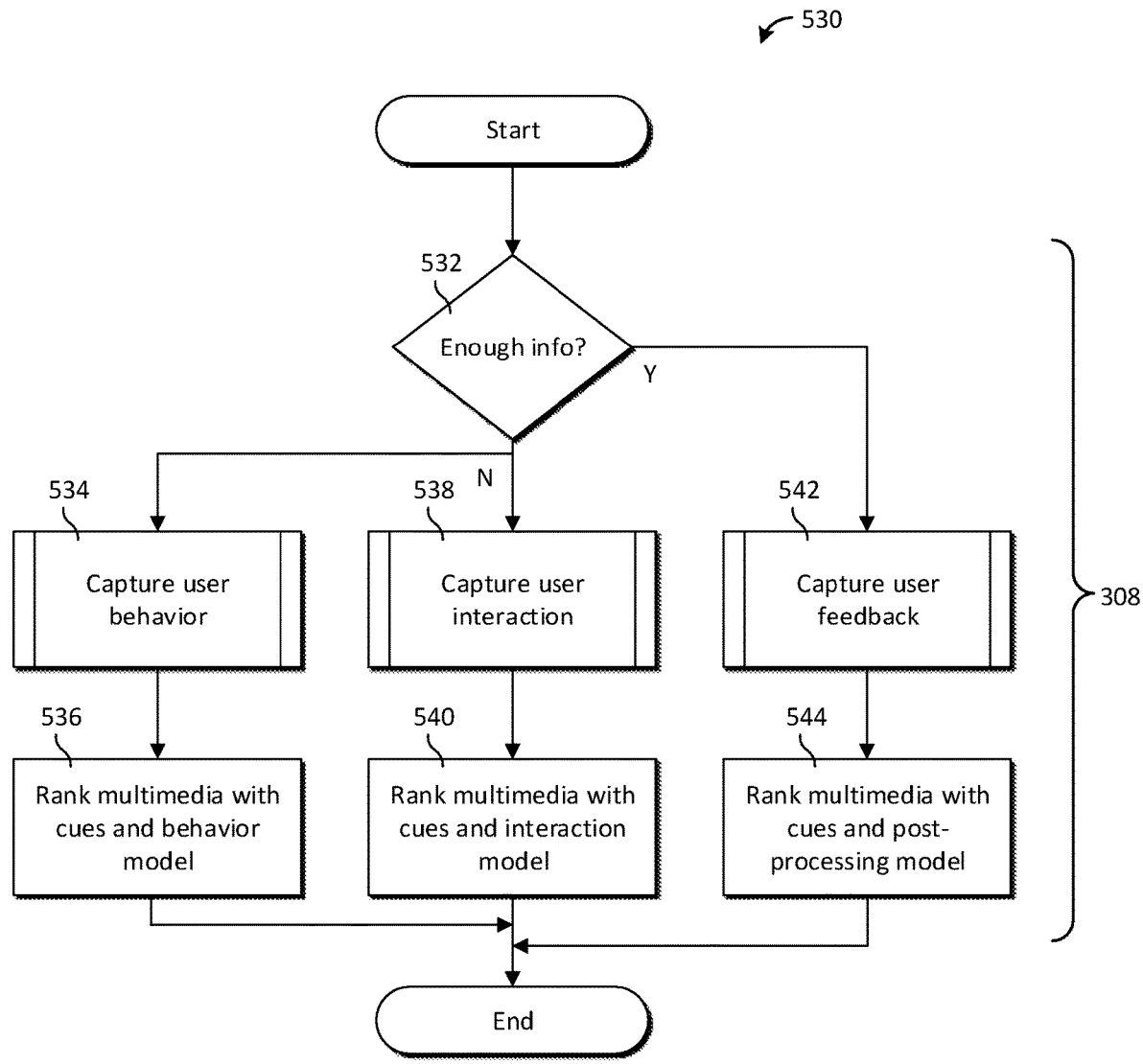

FIG. 5B illustrates an embodiment behavior and interaction recording method 530. The behavior and interaction recording method 530 may be a more detailed illustration of operations occurring when capturing user behavior, interactions, and feedback, in step 308 of the multimedia recommendation method 300. The behavior and interaction recording method 530 may be performed when the user is browsing or capturing multimedia content.

The behavior and interaction recording method 530 begins by determining whether enough information has been collected to generate recommendations for meaningful multimedia (step 532).

If sufficient information has not been gathered, then behavior of the user is captured to detect behavioral cues while the user browses multimedia (step 534). Multimedia content is then ranked with a behavior model and the behavioral cues (step 536). The behavior model may produce a score for the captured photo or video based on a combination of the various behavioral cues (e.g., via weighted sum operations).

The interactions of the user are also captured to detect interaction cues while the user browses multimedia (step 538). Multimedia content is then ranked with an interaction model and the interaction cues (step 540). The interaction model may combine (e.g., rank and sum) the various interaction cues to produce a score for the captured photo or video.

If sufficient information has been gathered, multimedia recommendations are generated and presented to the end user for feedback (step 542). The multimedia may be presented to the user, and the user may be prompted to save or discard the recommendations. Multimedia content is then ranked with a post-processing model and the feedback (step 544). The post-processing model may rank and sum the various user feedbacks to produce a score for other multimedia content that may be presented to the user. The user feedback may thus be used for a machine-learning process. Once the user's feedback, behavioral, and/or interaction cues are captured and recommendations are produced with the various models, the behavior and interaction recording method 530 concludes.

Figure 6:
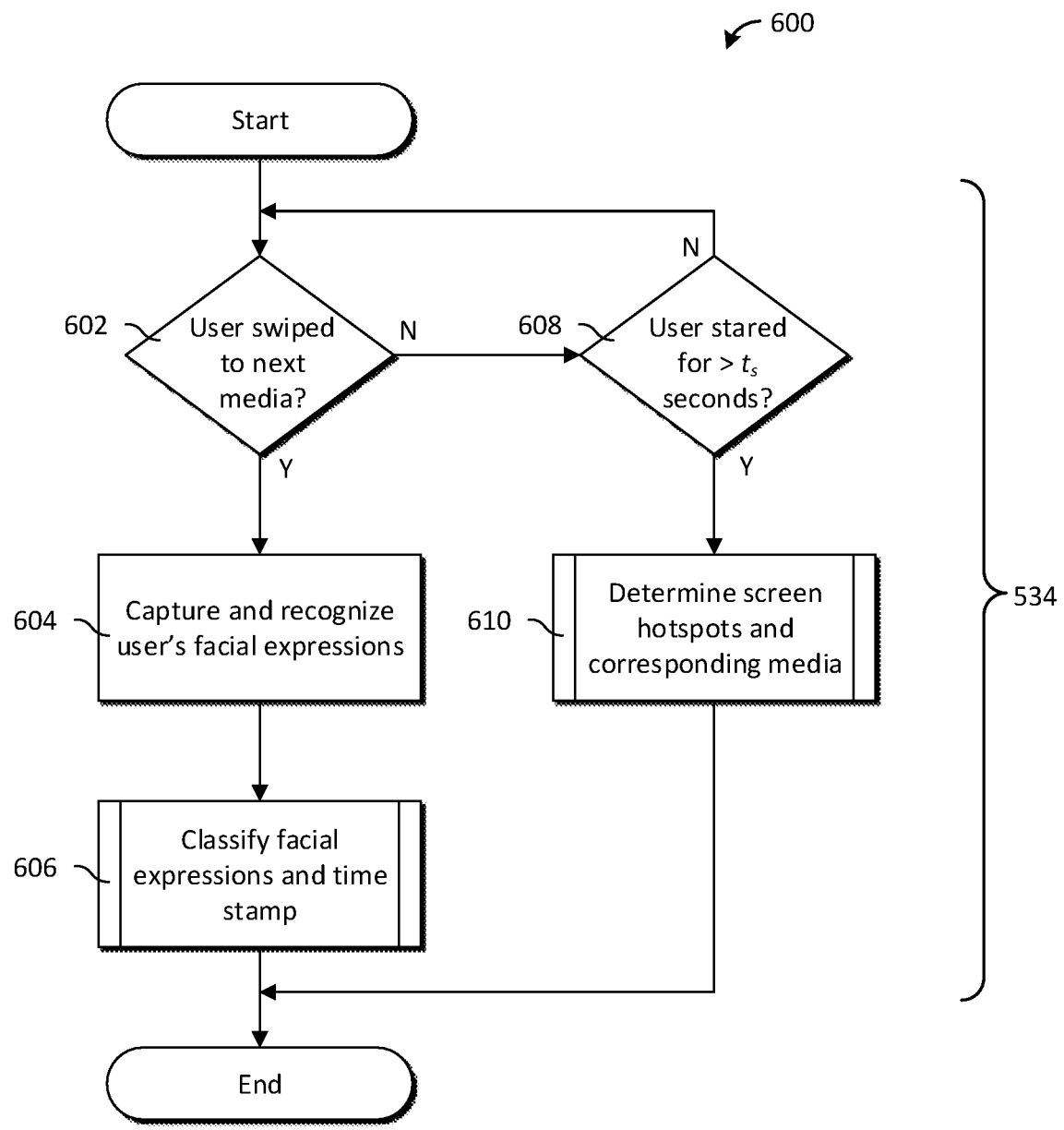
FIG. 6 illustrates an exemplary process to record cues representing user behavior.

FIG. 6 illustrates an embodiment user behavior recording method 600. The user behavior recording method 600 may be a more detailed illustration of operations occurring when capturing behavior of a user who is browsing multimedia, in step 534 of the behavior and interaction recording method 530.

The user behavior recording method 600 beings by determining whether the user has swiped to view a next multimedia file (step 602). If the user has swiped to the next multimedia file, facial expressions of the user are captured and recognized as they swipe (step 604). If the multimedia file is a video, then the facial expressions of the user may be captured throughout playback of the video. Once the facial expressions of the user have been captured and recognized, the facial expressions are then classified and time stamped (step 606). For example, a user's expression when they swipe to a new photo may be classified as a smile or as a frown, and that smile or frown may be saved with a time stamp indicating when the user viewed and smiled or frowned at the photo.

If the user has not yet swiped to the next multimedia file, then the user behavior recording method 600 determines whether the user has stared at the current multimedia file for more than a predetermined amount of time $t_s$ (step 608). In some embodiments, $t_s$ is about 2 seconds. If the user views the photo or video for more than the predetermined amount of time $t_s$, then hotspots of the screen and corresponding multimedia are determined (step 610). The user behavior recording method 600 concludes after the multimedia hotspots have been determined, or after the user's facial expressions are recognized and classified. The resulting behavioral cues from the user behavior recording method 600 may then be ranked by the behavior model, in step 536 of the behavior and interaction recording method 530.

Figure 7:
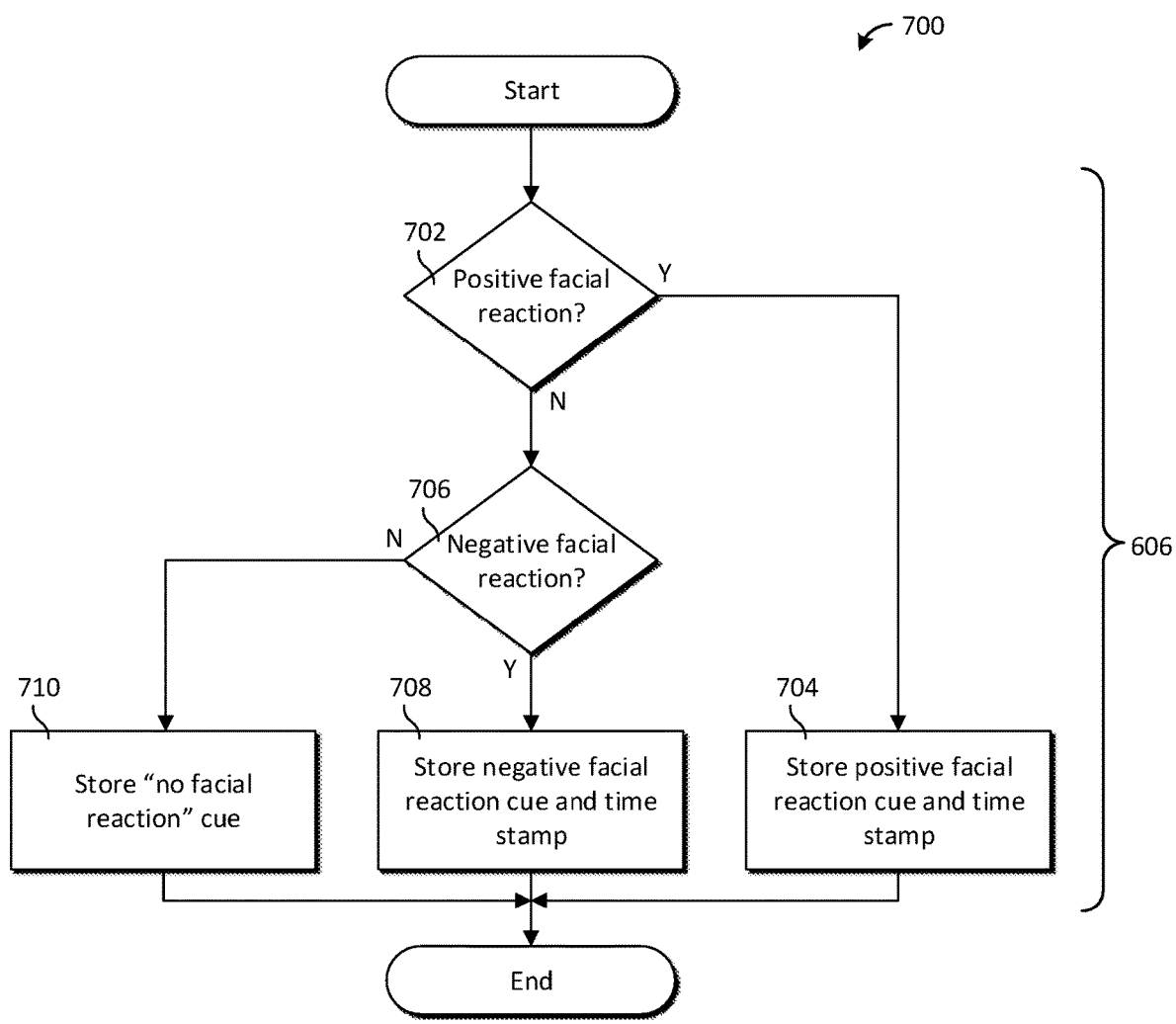
FIG. 7 illustrates an exemplary process to classify cues representing user facial expressions.

FIG. 7 illustrates an embodiment facial expression classification method 700. The facial expression classification method 700 may be a more detailed illustration of operations occurring when classifying facial expressions, in step 606 of the user behavior recording method 600.

The facial expression classification method 700 begins by determining whether the user's face has a positive facial reaction (step 702). Positive facial reactions may be, e.g., a laugh-like expression, captured when the user is viewing photos or videos. If a positive reaction is detected, it is stored as a positive facial reaction cue along with a time stamp (step 704). The positive reaction and time stamp are associated with the multimedia content that the user is currently viewing.

If a positive reaction is not detected, then the facial expression classification method 700 continues by determining whether the user's face has a negative facial reaction (step 706). Negative facial reactions may be, e.g., a frown-like expression, captured when the user is viewing photos or videos. If a negative reaction is found, it is stored as a negative facial reaction cue along with a time stamp (step 708). If neither a positive nor negative reaction is detected when the user is viewing multimedia, then a "no facial reaction" cue is stored along with a time stamp (step 710). The stored expressions may be associated with the multimedia content the user is viewing. Once a facial reaction cue, or the lack thereof, has been stored and time stamped, the facial expression classification method 700 concludes. The resulting facial reaction cues may be included with the behavioral cues ranked by the behavior model, in step 536 of the behavior and interaction recording method 530.

Figure 8:
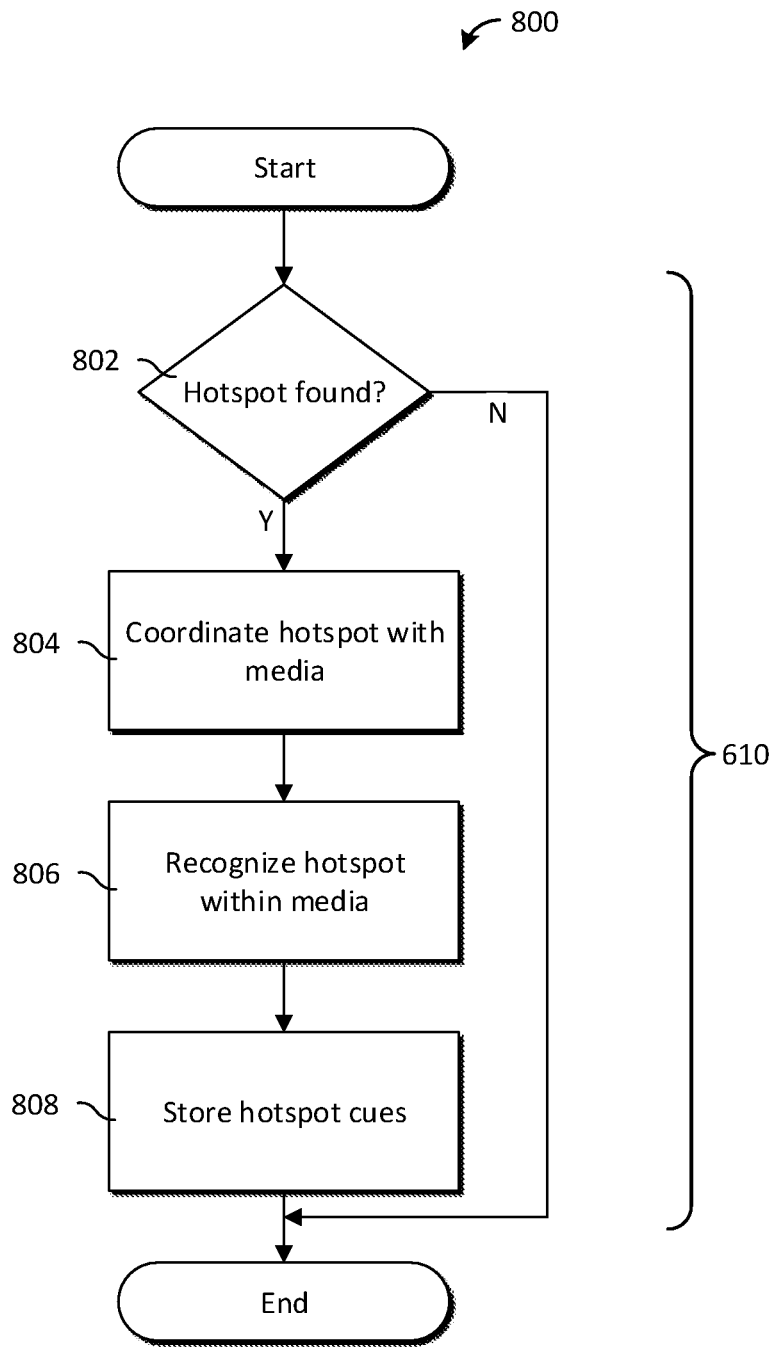
FIG. 8 illustrates an exemplary process to identify and track user gazing cues.

FIG. 8 illustrates an embodiment gaze tracking method 800. The gaze tracking method 800 may be a more detailed illustration of operations occurring when determining hotspots of the screen and corresponding photos, in step 610 of the user behavior recording method 600.

The gaze tracking method 800 begins by searching for a hotspot in a multimedia file (step 802). A hotspot may be a location in a multimedia file that a user is staring at. For example, the user may be looking at a particular individual in a photograph that contains several individuals. The user's gaze is tracked until a hotspot on the device display is detected. Once a hotspot is detected, the multimedia file is coordinated with the hotspot location on the device display (step 804). For example, if the user was looking at a particular corner of the device display, then the image may be coordinated with the device display to determine the particular subject or object in the image that the user was staring at. Once the photo or video has been coordinated, the hotspot is recognized (step 806). Recognition of the hotspot may include, for example, performing facial recognition to determine what the user was staring at in the hotspot. Once the subject in the hotspot is recognized and determined, hotspot cues are stored for the multimedia file (step 808). After the hotspot cues have been stored, the gaze tracking method 800 concludes. The resulting hotspot cues may be included with the behavioral cues ranked by the behavior model, in step 536 of the behavior and interaction recording method 530.

Figure 9:
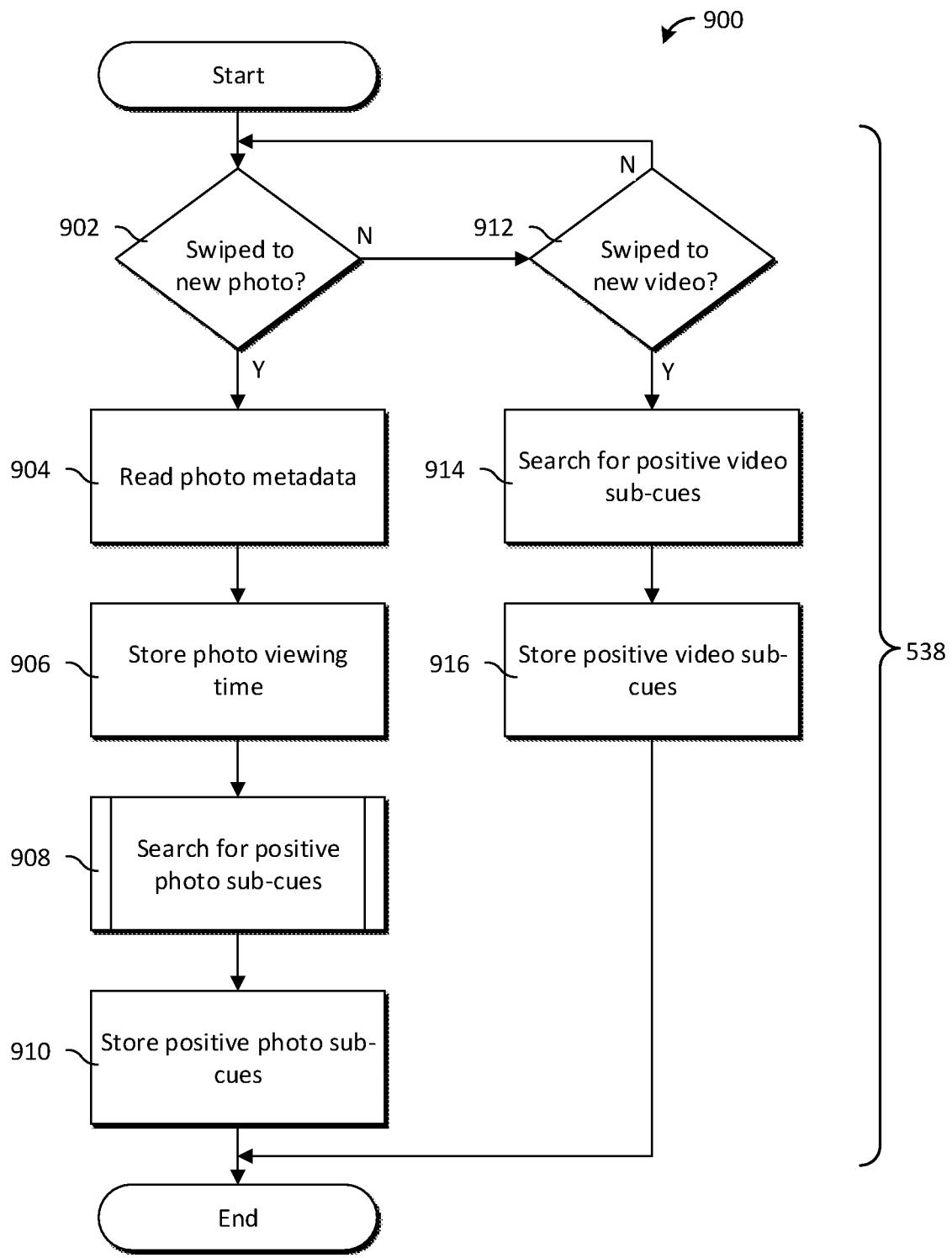
FIG. 9 illustrates an exemplary process to identify and record user interactions with a device which performs a multimedia operation, according to an embodiment of the present invention.

FIG. 9 illustrates an embodiment user interaction recording method 900. The user interaction recording method 900 may be a more detailed illustration of operations occurring when capturing interactions or cues of a user who is browsing multimedia, in step 538 of the behavior and interaction recording method 500. The user interaction recording method 900 may be performed, for example, while a user is viewing photos or videos on the device.

The user interaction recording method 900 begins by determining whether the user has swiped to a new photo (step 902). If the user has swiped to a new photo, then the photo metadata is read (step 904). Once the photo metadata is read, the amount of time the user spends viewing the photo is noted and stored (step 906). Once the view time has been stored, the user's interactions with the photo are searched for positive sub-cues (step 908). Positive sub-cues for a photo may include an indication that the user edited, published, shared, or oriented the photo, as will be discussed in more detail below. Once positive sub-cues are detected the sub-cues may then be stored (step 910).

If the user has not swiped to a new photo, then the user interaction recording method 900 determines whether the user has swiped to a new video (step 912). Once the user has swiped to a new video, the user's interactions with the video are searched for positive sub-cues (step 914). Positive sub-cues for a video may include notations that the user paused or rewound the video. Once positive sub-cues for the video are found, the positive sub-cues for the video are stored (step 916).

Once the positive photo or video sub-cues are stored, the user interaction recording method 900 concludes. The resulting interaction cues from the user interaction recording method 900 may then be ranked by the interaction model, in step 540 of the behavior and interaction recording method 530

Figure 10A:
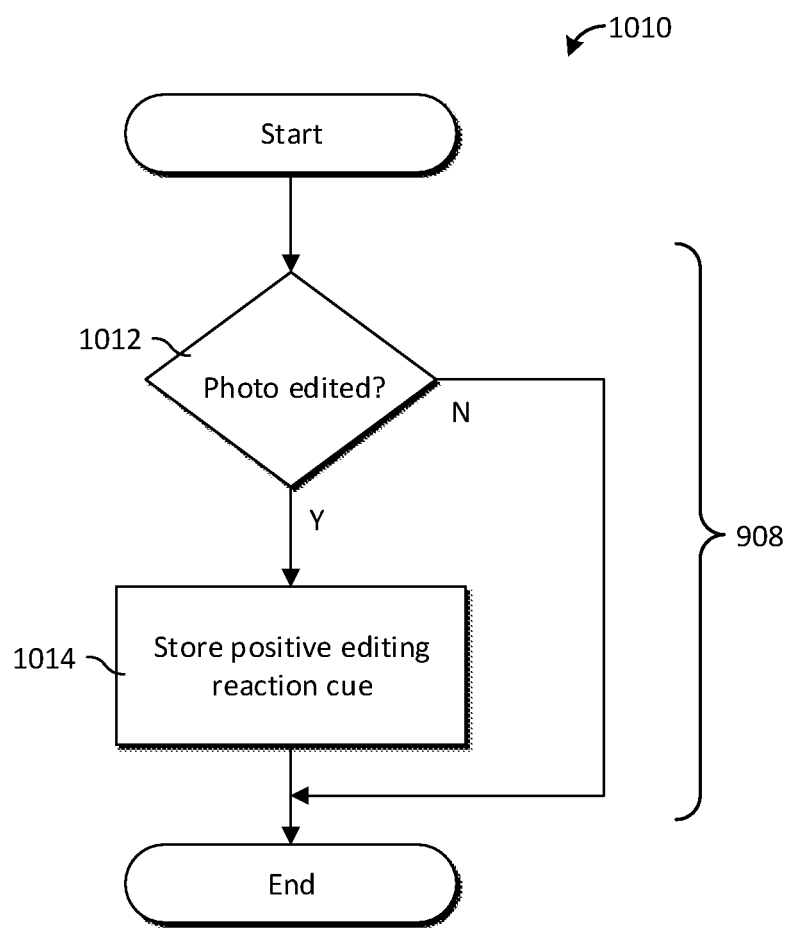
FIGS. 10A-10D illustrate various exemplary processes to detect photo sub-cues.

FIG. 10A illustrates an embodiment photo sub-cue detection method 1010. The photo sub-cue detection method 1010 may be a more detailed illustration of operations occurring when searching for positive sub-cues in a user's interactions with a photo, in step 908 of the user interaction recording method 900. The photo sub-cue detection method 1010 may detect whether a user has edited a photo.

The photo sub-cue detection method 1010 begins by determining whether the user has edited a photo (step 1012). Editing of a photo may include actions such as cropping the photo or manipulating it in an image processing suite. Editing of a photo may be detected if, e.g., metadata of the photo indicates it was captured by a device besides the back camera of the user device. If the user has edited the photo, then a positive editing reaction cue for the photo is stored (step 1014). If the user has not edited the photo, then no editing reaction cue is stored. After an editing reaction cue is stored, the photo sub-cue detection method 1010 concludes. By determining whether the user edited the photo, the photo sub-cue detection method 1010 thus gauges whether a photo was meaningful enough to the user that they desired to touch up the photo.

Figure 10B:
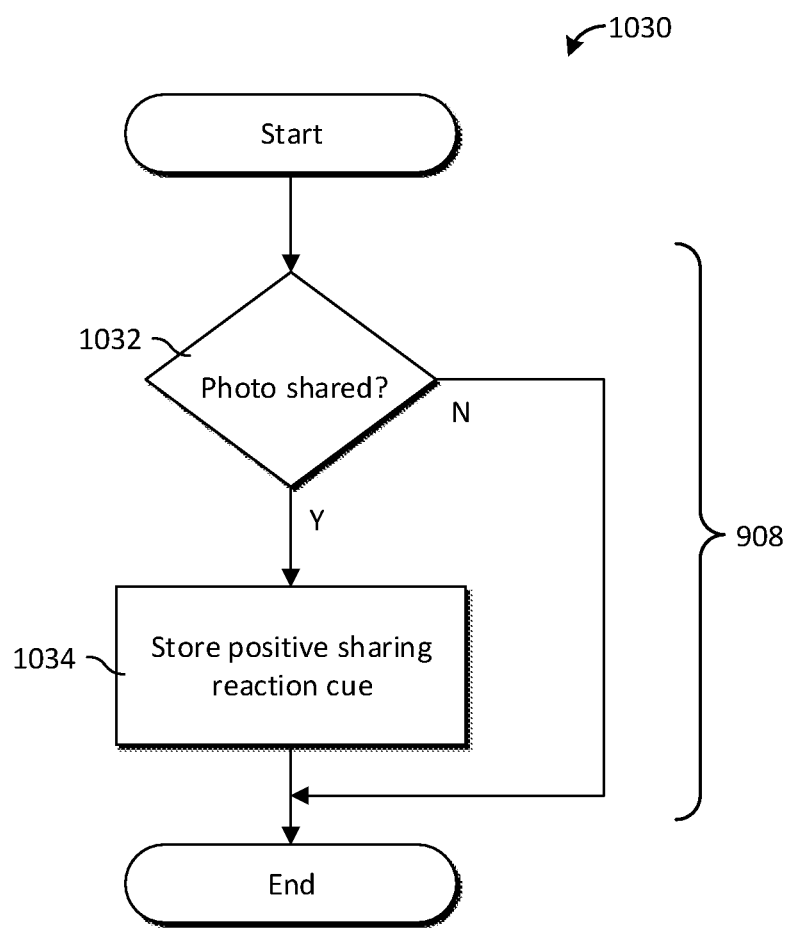

FIG. 10B illustrates an embodiment photo sub-cue detection method 1030. The photo sub-cue detection method 1030 may be a more detailed illustration of operations occurring when searching for positive sub-cues in a user's interactions with a photo, in step 908 of the user interaction recording method 900. The photo sub-cue detection method 1030 may detect whether a user has shared a photo.

The photo sub-cue detection method 1030 begins by determining whether the user has shared a photo (step 1032). Sharing of a photo may include actions such as emailing the photo, sending it via SMS, or posting it to a social media website. If the user has shared the photo, then a positive sharing reaction cue for the photo is stored (step 1034). If the user has not shared the photo, then no sharing reaction cue is stored. After a sharing reaction cue is stored, the photo sub-cue detection method 1030 concludes. By determining whether the user shared the photo, the photo sub-cue detection method 1030 thus gauges whether a photo was meaningful enough to the user that they desired to share the photo, e.g., with family or friends.

Figure 10C:
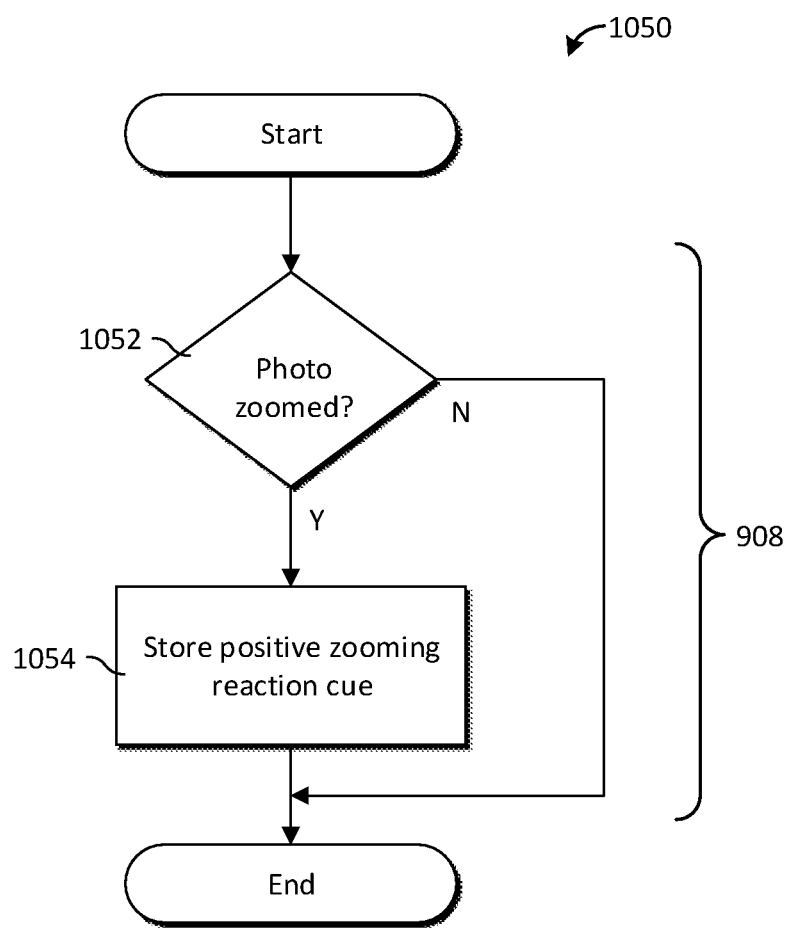

FIG. 10C illustrates an embodiment photo sub-cue detection method 1050. The photo sub-cue detection method 1050 may be a more detailed illustration of operations occurring when searching for positive sub-cues in a user's interactions with a photo, in step 908 of the user interaction recording method 900. The photo sub-cue detection method 1050 may detect whether a user has zoomed into a photo.

The photo sub-cue detection method 1050 begins by determining whether the user has zoomed into a photo (step 1052). Zooming into a photo may be accomplished by, e.g., pinching the device display to zoom in at the pinch point. If the user has zoomed into the photo, then a positive zooming reaction cue for the photo is stored (step 1054). If the user has not zoomed into the photo, then no zooming reaction cue is stored. After a zooming reaction cue is stored, the photo sub-cue detection method 1050 concludes. By determining whether the user zoomed into the photo, the photo sub-cue detection method 1050 thus gauges whether a photo was meaningful enough to the user that they desired a better view of the photo.

Figure 10D:
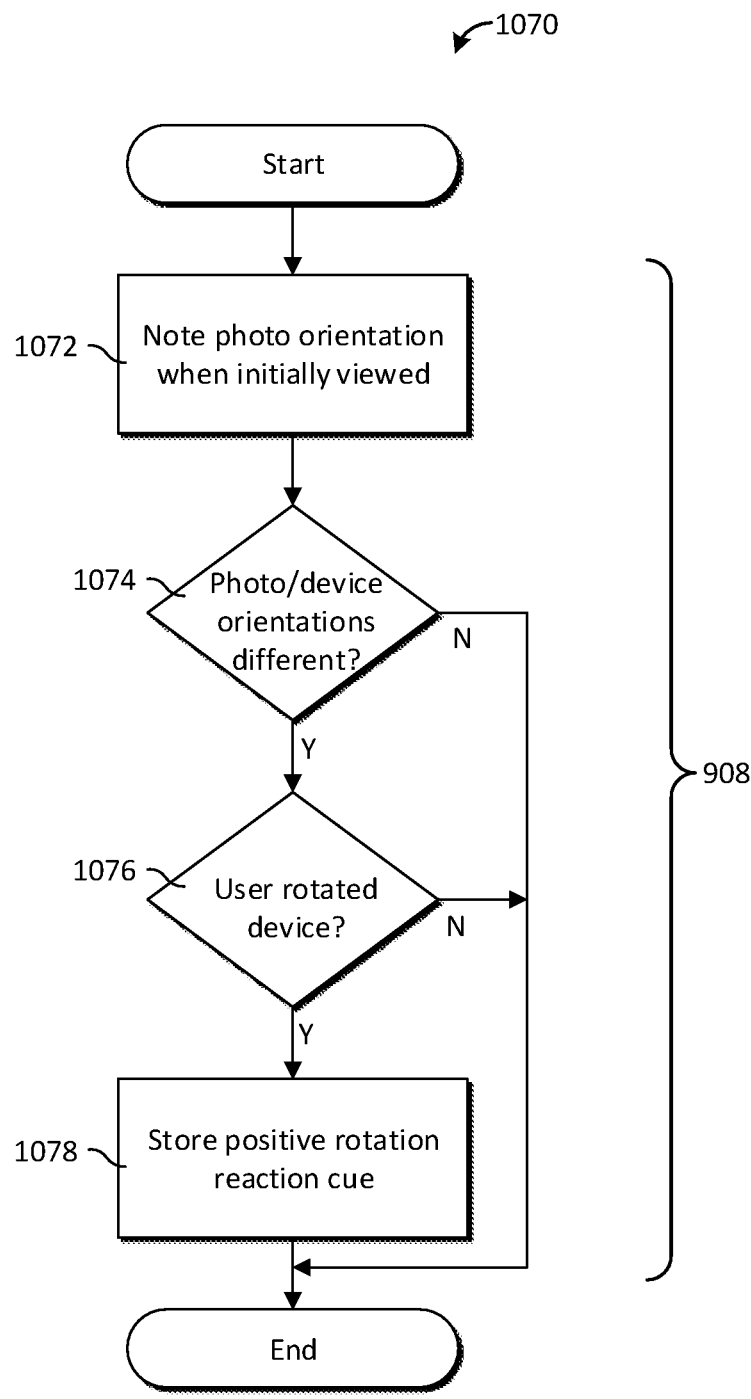

FIG. 10D illustrates an embodiment photo sub-cue detection method 1070. The photo sub-cue detection method 1070 may be a more detailed illustration of operations occurring when searching for positive sub-cues in a user's interactions with a photo, in step 908 of the user interaction recording method 900. The photo sub-cue detection method 1070 may detect whether a user has rotated the orientation of a photo.

The photo sub-cue detection method 1070 begins by noting the orientation of a photo when the photo is initially viewed (step 1072). For example, a photo may have been taken in a portrait or landscape orientation. Photos taken in an orientation different from that of the device display may be rotated when displayed on the device. Once the initial photo orientation has been noted, it is compared to the current orientation of the user device display to determine whether the photo was taken in a different orientation than that of the user device display (step 1074). If the initial orientation of the photo and orientation of the user device display are the same, then the photo sub-cue detection method 1070 concludes.

If the initial orientation of the photo and orientation of the user device display are different, then the photo sub-cue detection method 1070 continues by determining whether the user rotated the user device to change the display orientation of the device (step 1076). Determining a rotation of orientation may be accomplished by, e.g., sensing changes in an accelerometer integrated into the user device. If the user has not rotated the device to change the display orientation, then the photo sub-cue detection method 1070 concludes.

If the user has rotated the device to change the display orientation, then the photo sub-cue detection method 1070 continues by storing a positive rotation reaction cue for the photo (step 1078). Once the positive rotation reaction cue has been stored, the photo sub-cue detection method 1070 concludes. By determining whether the user rotated the device to match the photo's original orientation, the photo sub-cue detection method 1070 thus gauges whether a photo was meaningful enough to the user that they desired a better view of the photo.

Figure 11:
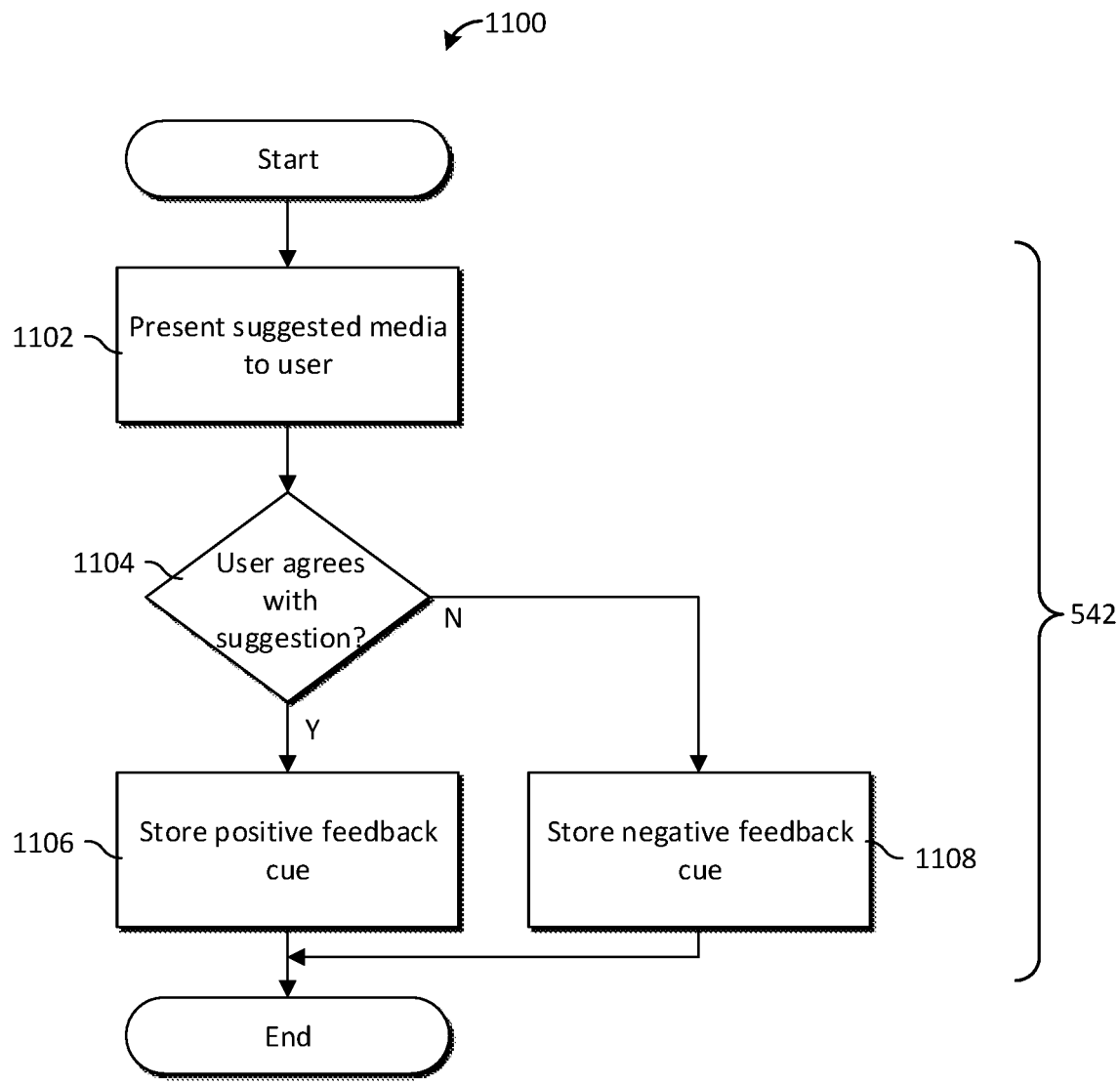
FIG. 11 illustrates an exemplary process to identify cues representing user feedback for multimedia recommendation.

FIG. 11 illustrates an embodiment user feedback and prediction method 1100. The user feedback and prediction method 1100 may be a more detailed illustration of operations occurring when generating and presented recommendations to the user for feedback, in step 542 of the user behavior and interaction recording method 530.

The user feedback and prediction method 1100 begins by presenting suggested multimedia to the user (step 1102). Once the multimedia is presented to the user, feedback is requested from the user and the feedback is analyzed to determine whether the user agrees with or disagrees with the suggestion (step 1104). User feedback may be, e.g., a like or dislike button overlaid on the multimedia when it is presented to the user. If the user agrees with the suggestion, then a positive feedback cue for the suggestion is stored (step 1106). However, if the user disagrees with the suggestion, then a negative feedback cue for the suggestion is stored (step 1108). Once a feedback cue for the multimedia has been stored, the user feedback and prediction method 1100 ends.

As discussed above with respect to FIG. 2, the auto-favorites view 204 may be provide recommendations according to predicted meaningfulness to a particular user. Different input cues may be more meaningful to particular users. By presenting multimedia suggestions to the user and receiving user feedback, the user feedback and prediction method 1100 allows the user device to determine what cues are relatively more meaningful to particular users. For example, the editing or sharing photo sub-cues (discussed with respect to FIGS. 10A-10B) may be more meaningful to a first kind of user, while the photo zoom and orientation sub-cues (discussed with respect to FIGS. 10C-10D) may be more meaningful to a second kind of user. The user feedback and prediction method 1100 may thus be part of a machine learning process that learns which cues and sub-cues are more meaningful to particular users. The meaningfulness of cues and sub-cues to each user may be stored in the profile associated with each user, and then loaded with a user's profile when that user operates the device (discussed with respect to FIG. 4).

Figure 12:
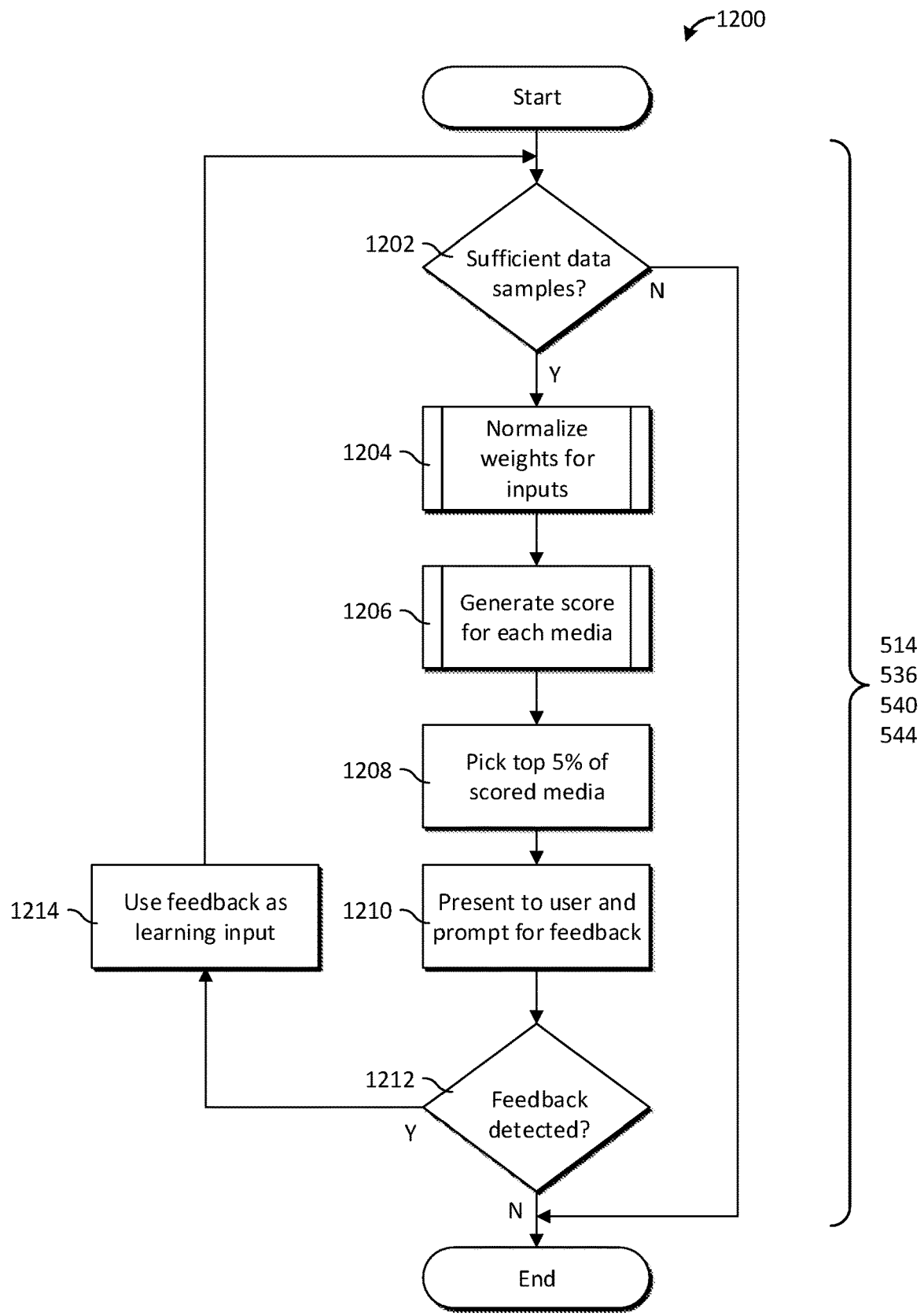
FIG. 12 illustrates an exemplary process to configuring a recommendation engine according to user feedbacks in one embodiment of the present invention.

FIG. 12 illustrates an embodiment cue ranking method 1200. The cue ranking method 1200 may be a more detailed illustration of operations occurring when ranking cues or sub-cues according to the various models discussed above, such as step 514 of FIG. 5A or steps 536, 540, or 544 of FIG. 5B.

The cue ranking method 1200 begins by determining whether there are sufficient data samples to rank cues or sub-cues for a user (step 1202). The sufficiency of data samples may be determined, e.g., by comparing the quantity of data samples to a threshold quantity. If there are sufficient data samples, then weights of the cues are normalized (step 1204). Once the weights of the cues are normalized, the multimedia files on the device are analyzed and a score is generated for each multimedia file (step 1206). After scores for each multimedia file are generated, the top 5% of scored multimedia is selected for recommendation and added to an auto-favorites view (step 1208). Once the auto-favorites view is populated with recommended multimedia, the user is presented the recommended multimedia and prompted for feedback (step 1210). The feedback prompt presented to the user may include, e.g., a like or dislike button. Once the user is presented with the recommended multimedia, the cue ranking method 1200 determines whether the user has provided feedback for the recommended multimedia (step 1212). If the user has not provided feedback, then the cue ranking method 1200 concludes.

If the user has provided feedback, then the cue ranking method 1200 continues by using the feedback as a learning input and repeating the steps of the cue ranking method 1200 (step 1212). As discussed above with respect to FIG. 11, different input cues may be more meaningful to particular users. Using the feedback as a learning input may include determining which cues or sub-cues are more meaningful to a particular user, based on the feedback the user provided in response to the recommended multimedia presented in step 1210. The learning inputs may be refined by repeating the steps of the cue ranking method 1200 several times, each time with newer learning inputs. Repeating this process may more accurately determine the cues and sub-cues that are more meaningful to particular users.

Figure 13:
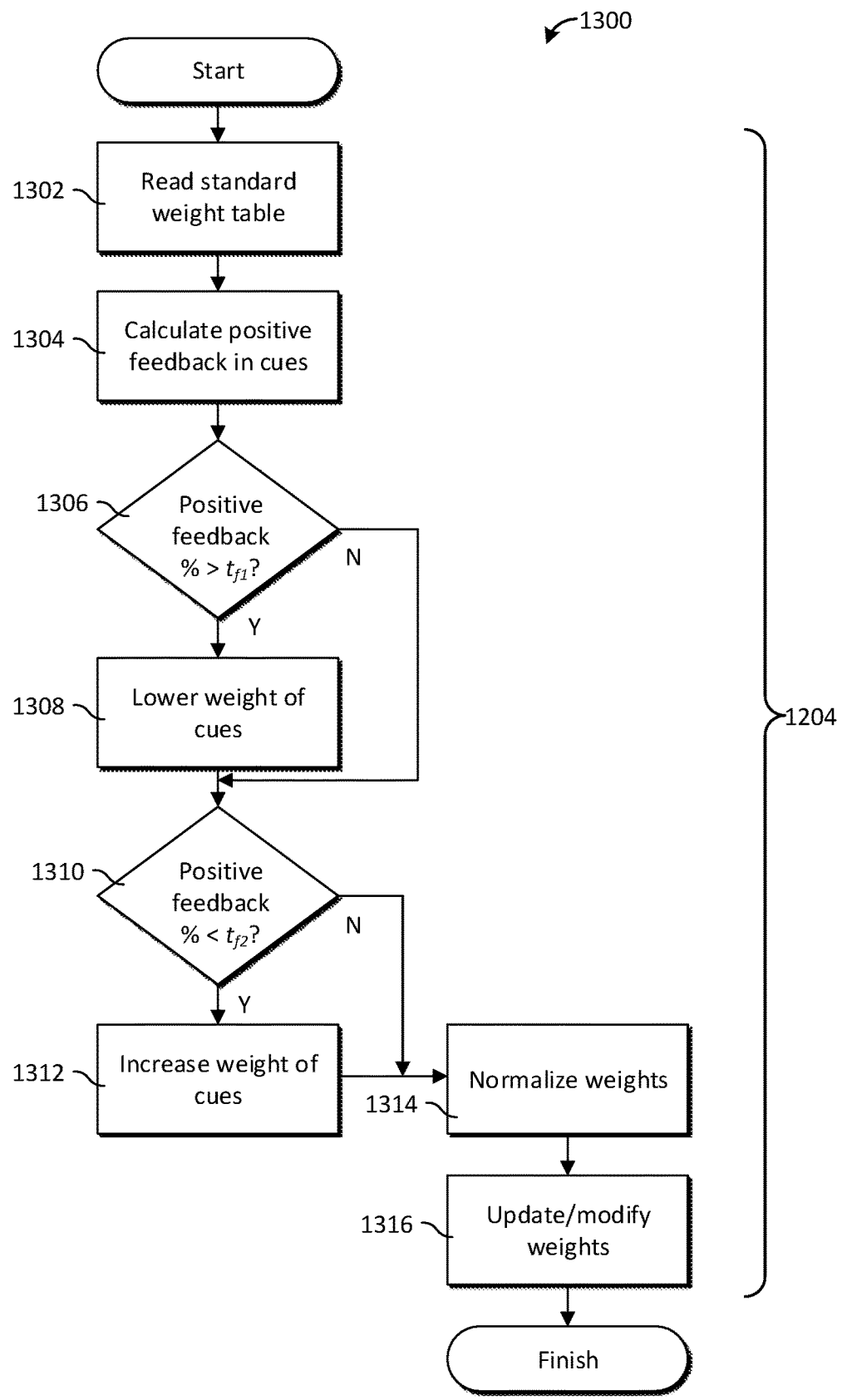
FIG. 13 illustrates an exemplary process to adjust weight factors in a recommendation engine in one embodiment of the present invention.

FIG. 13 illustrates an embodiment cue weight normalization method 1300. The cue weight normalization method 1300 may be a more detailed illustration of operations occurring when normalizing the weights of cues, in step 1204 of the cue ranking method 1200.

The cue weight normalization method 1300 begins by reading a standard weight table (step 1302). The standard weight table may be predetermined by or stored on the user device, and may serve as a starting point for refining feedback used to generate learning inputs. The standard weight table includes weights for behavior and interaction inputs that would be expected from a typical user, e.g., "model user behavior." Once the standard weight table has been read, the percentage of positive feedback out of all available feedback in the input cues is computed (step 1304). After the percentage of positive feedback has been calculated, it is compared with a threshold $t_{f1}$ to determine whether the percentage of positive feedback exceeds $t_{f1}$ (step 1306). In some embodiments, the threshold $t_{f1}$ is about 60% positive feedback in the input cues.

If the percentage of positive feedback in the input cues exceeds the threshold $t_{f1}$, then the weights of the cues are lowered (step 1308). The weights of the cues may be lowered by decreasing the weight of each cue by a predefined step. The predefined step for each cue may be determined according to a percentile for that cue's weight. For example, cues in the top 10% of weight may be lowered by a larger step than cues in the top 50% of weight. The weight of the cues may be lowered until the weight of each cue is approximately equal to the step associated with the next weight decrease for that cue.

After the weights of the cues are lowered, or if the percentage of positive feedback in the input cues is less than the threshold $t_{f1}$, then the percentage of positive feedback is again calculated and compared with a threshold $t_{f2}$ to determine if the percentage of positive feedback is less that threshold (step 1310). In some embodiments, the threshold $t_{f2}$ is about 30% positive feedback in the input cues. If the percentage of positive feedback in the input cues is less than the threshold $t_{f2}$, then the weights of the cues are raised (step 1312). The weights of the cues may be raised by increasing the weight of each cue by a predefined step. The predefined step for each cue may be determined according to a percentile for that cue's weight. For example, cues in the bottom 10% of weight may be raised by a larger step than cues in the bottom 50% of weight.

Once the weight of the cues has been adjusted, the weights of the cues are then normalized (step 1314). The weights may be normalized by summing a total of all weights and then dividing each weight by that sum. After weights of the cues are normalized, the cues are then used as feedback for updating or modifying the weights in the standard weight table (step 1316). A particular user's behavior will likely not precisely track the model user behavior from the standard weight table. Thus, differences between the particular user's behavior and the model user behavior may bias predictions. Adjusted the weights from the standard weight table may mitigate this biasing. Once the standard weight adjustment is performed, the cue weight normalization method 1300 concludes.

Figure 14:
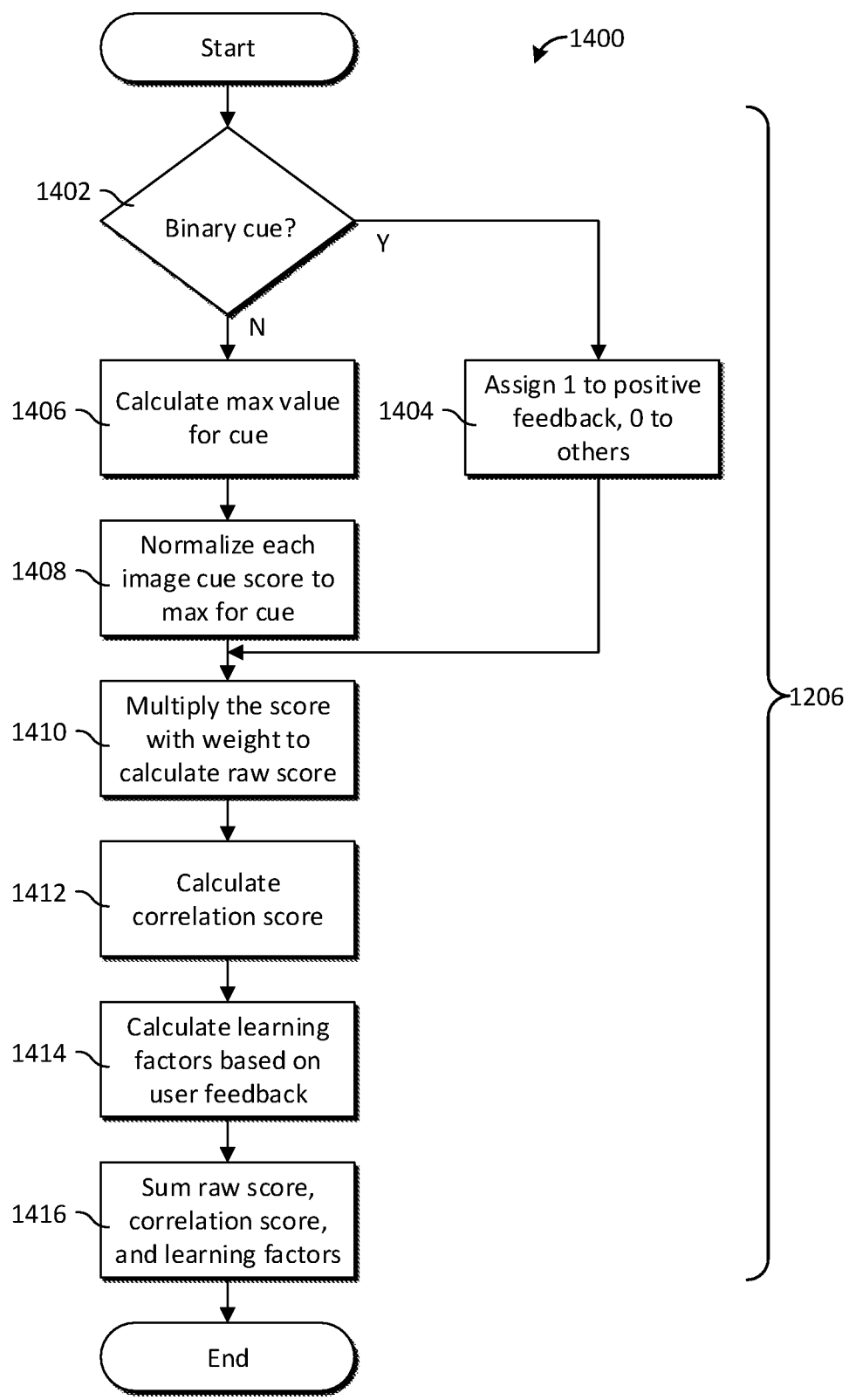
FIG. 14 illustrates an exemplary process to generate ranking scores in one embodiment of the present invention.

FIG. 14 illustrates an embodiment score generation method 1400. The score generation method 1400 may be a more detailed illustration of operations occurring when generating a score for each photo or video, in step 1206 of the cue ranking method 1200.

The score generation method 1400 begins by determining whether a cue is a binary or a word value (step 1402). A cue may be binary when the cue simply indicates a value of true or false, which correlates to the presence or absence of a positive or negative reaction. Binary cues may include cues such as a smile or a frown being detected when performing facial recognition of a user's behavior. If a cue is a binary value, then the cue is assigned a score of 1 for a positive results and a score of 0 for negative results (step 1404).

If a cue is not a binary value, then it is a word value. A cue may be a word value when the cue measures a discrete metric. Word cues may include cues such as viewing time, quantity of views, quantity of shares to social media, etc. If a cue is a word value, then the maximum value for the cue is calculated (step 1406). The maximum value for a cue is calculated by determining the maximum value for the cue within all images considered. For example, the maximum value for the view time cue is determined by measuring the view time for each image considered, and then taking the largest of those measurements as the maximum value. In some embodiments, instead of calculating the maximum value every time, the maximum value for particular cues may be computed and stored periodically, then retrieved when needed. After the maximum value for the cue is calculated or retrieved, the cue value is normalized by dividing the current value of the cue by the maximum value for the cue (step 1408). For example, if one of the cues considered is viewing time, and the maximum value for viewing time is determined to be 60 seconds, then for a photo with a view time of 45 seconds, the normalized value for that photo's view time cue would be calculated as: 45÷60=0.75.

Once a score has been assigned to each cue for each photo or video, a raw score is computed by multiplying the normalized value for each cue by that cue's weight (step 1410). Continuing the example of the photo above, if the weight for the viewing time cue is determined to be 0.5, then the raw score for the photo's view time cue would be calculated as: 0.5×0.75=0.375.

Once a raw score has been computed for each cue for each image, a correlation score is computed for the photo or video (step 1412). The correlation score is computed by comparing one or more cues for a photo or video against a reference photo or video. Correlation scores help reinforce prediction confidence be recognizing patterns in higher-confidence predictions or user feedback. Next, a learning factor is computed for each cue based on user feedback (step 1414). The user feedback may be feedback obtained from, e.g., the user feedback and prediction method 1100. Finally, an image score is calculated by summing the raw scores, the correlation scores, and the learning factor (step 1414). The image score is thus computed according to:

$$s_{img} = \sum_{n=1}^{t} (w_n * p_n) + (w_c * p_c) + f,$$

where $s_{img}$ is the image score, t is the total quantity of cues, $w_n$ is the weight of a cue, $p_n$ is the value for a cue, $w_c$ is the weight of the correlation cue, $p_c$ is the value of the correlation cue, and f is the learning factor. Once the image score is calculated, the score generation method 1400 concludes. The image scores may then be compared and the top scoring images may be recommended to the user.

Table 1, illustrated below, shows scoring results for two example images using embodiment techniques:

TABLE 1

| | | Photo 1 | | Photo 2 | |
|---|---|---|---|---|---|
| Cue | Weight | Detected Data | Score | Detected Data | Score |
| Total view time | 0.50 | 60 second | 0.50 | 5 seconds | 0 |
| Quantity of views | 0.1 | 10 views | 0.1 | 2 views | 0 |
| Quantity of shares | 0.15 | 3 shares | 0.15 | 0 shares | 0 |
| Orientation matched | 0.05 | 8 times | 0.05 | 1 time | 0 |
| Captured by outside camera | 0.02 | Yes | 0.02 | No | 0 |
| Edited | 0.05 | Yes | 0.05 | No | 0 |
| Viewer's reactions | 0.10 | Smiled | 0.10 | None | 0 |
| Zoomed | 0.02 | 3 times | 0.02 | 1 time | 0.02 |
| | | TOTAL SCORE | 0.99 | TOTAL SCORE | 0.02 |

As can be seen above in Table 1, two example photos have been ranked according to the weight and values of their cues. Photo 1 has a high view time and has been shared, viewed, oriented, and zoomed many times. Accordingly, the image score for photo 1 is computed to be 0.99, indicating a relatively high likelihood that this photo will be meaningful to a user. Conversely, photo 2 has a relatively low view time and has been shared, viewed, oriented, and zoomed few times. Accordingly, the image score for photo 2 is computed to be 0.02, indicating a relatively low likelihood that this photo will be meaningful to a user. Thus, photo 1 will be recommended to the user, while photo 2 will not be recommended to the user.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
enabling a sensing device on a user device in response to a user requesting a multimedia operation, the multimedia operation comprising displaying a multimedia content on a display of the user device, the multimedia content being a photograph or a video, the multimedia content being stored in a multimedia library;
performing the multimedia operation;
identifying behavioral cues of the user according to signals received from the sensing device substantially when the multimedia operation is being performed, wherein identifying the behavioral cues of the user comprises:
searching for multimedia sub-cues in the signals captured from the sensing device; and
classifying the multimedia sub-cues as positive reactions or negative reactions to produce the behavioral cues;
identifying interaction cues of the user according to whether the user interacts with an input device of the user device substantially when the multimedia operation is being performed, the interaction cues indicating whether, during the displaying of the multimedia content on the display of the user device, the user viewed the multimedia content for a predetermined amount of time, shared the multimedia content, edited the multimedia content, zoomed into the multimedia content, and rotated the user device to match an original orientation of the multimedia content;
selecting a subset of the multimedia library according to the behavioral cues and further according to the interaction cues;
displaying the subset of the multimedia library on the display of the user device;
requesting feedback from the user in response to presenting the subset of the multimedia library;
classifying the feedback from the user as a positive reaction or a negative reaction to produce feedback cues; and
selecting a further subset of the multimedia library in accordance with the feedback cues.

2. The method of claim 1, wherein searching for multimedia sub-cues comprises producing the multimedia sub-cues in response to a view time for the multimedia content.

3. The method of claim 1, wherein searching for multimedia sub-cues comprises producing the multimedia sub-cues in response to the user sharing the multimedia content.

4. The method of claim 1, wherein searching for multimedia sub-cues comprises producing the multimedia sub-cues in response to the user editing the multimedia content.

5. The method of claim 1, wherein searching for multimedia sub-cues comprises producing the multimedia sub-cues in response to the user zooming into the multimedia content.

6. The method of claim 1, wherein searching for multimedia sub-cues comprises producing the multimedia sub-cues in response to the user rotating the user device in order to match an orientation of the user device with an orientation of the multimedia content.

7. The method of claim 1, wherein identifying the behavioral cues of the user comprises:
capturing facial expressions of the user with the sensing device; and
recognizing the facial expressions of the user to produce the behavioral cues.

8. The method of claim 7, wherein recognizing the facial expressions comprises classifying the facial expressions of the user as a positive facial reaction, a negative facial reaction, or a lack of facial reaction.

9. The method of claim 7, wherein recognizing the facial expressions comprises recognizing a gaze of the user as the user stares at a hotspot on a display of the user device.

10. The method of claim 1, wherein identifying the behavioral cues of the user comprises:
capturing ambient activity with the sensing device; and
analyzing the ambient activity to produce the behavioral cues.

11. The method of claim 10, wherein capturing the ambient activity comprises capturing sound with the sensing device while performing the multimedia operation.

12. The method of claim 10, wherein capturing the ambient activity comprises:
capturing video with the sensing device;
performing facial recognition to detect subjects in the video; and
correlating subjects in the video with entries in a contact list on the user device.

13. A method comprising:
providing a plurality of multimedia content on a user device;
displaying a first subset of the multimedia content on a display of the user device;
capturing behavioral cues of a user with a sensing device when displaying the first subset of the multimedia content, wherein capturing the behavioral cues of the user comprises:
  capturing signals from the sensing device;
  searching for multimedia sub-cues in the signals captured from the sensing device; and
  classifying the multimedia sub-cues as positive reactions or negative reactions to produce the behavioral cues;
identifying interaction cues of a user with an input device when displaying the first subset of the multimedia content, the interaction cues indicating the user manipulated the first subset of the multimedia content using the input device during the displaying, wherein the interaction cues indicate the user manipulated the first subset of the multimedia content when the user shared the multimedia content, edited the multimedia content, zoomed into the multimedia content, and rotated the user device to match an original orientation of the multimedia content;
analyzing the behavioral cues and the interaction cues to produce multimedia cues;
assigning weights to each of the multimedia cues;
generating a score for each of the plurality of multimedia content in accordance with the weights and the multimedia cues;
displaying a second subset of the multimedia content on the display in accordance with the scores;
requesting feedback from the user in response to displaying the second subset of the multimedia content;
classifying the feedback from the user as a positive reaction or a negative reaction to produce feedback cues; and
displaying a third subset of the multimedia content on the display in accordance with the feedback cues.

14. The method of claim 13, further comprising:
adjusting the weights for each of the multimedia cues in accordance with the behavioral cues and further according to the interaction cues of the user; and
normalizing the weights.

15. The method of claim 13, wherein generating the scores for each of the plurality of multimedia content comprises:
computing and summing raw scores for each of the multimedia cues in accordance with the weights;
computing and applying a correlation factor to the raw scores; and
applying a learning factor to the raw scores to produce the scores.

16. The method of claim 15, wherein producing the scores comprises computing the score according to:

$$s_{img} = \sum_{n=1}^{t} (w_n * p_n) + (w_c * p_c) + f,$$

wherein t is a total quantity of multimedia cues, wn is the weight of a multimedia cue, pn is a value of a multimedia cue, wc is a correlation factor weight, pc is a correlation factor value, and f is the learning factor.

17. A device comprising:
a sensing device;
an input device different from the sensing device;
a display;
a processor; and
a computer-readable storage medium storing a program to be executed by the processor, the program including instructions to perform a method comprising:
  enabling the sensing device in response to a user requesting a multimedia operation, the multimedia operation comprising displaying a multimedia content on the display, the multimedia content being a photograph or a video, the multimedia content being stored in a multimedia library;
  identifying behavioral cues of the user according to signals captured from the sensing device while performing the multimedia operation, wherein identifying the behavioral cues of the user comprises:
    searching for multimedia sub-cues in the signals captured from the sensing device; and
    classifying the multimedia sub-cues as positive reactions or negative reactions to produce the behavioral cues;
  identifying interaction cues of the user according to whether the user interacts with the input device while performing the multimedia operation, the interaction cues indicating whether, during the displaying of the multimedia content on the display, the user viewed the multimedia content for a predetermined amount of time, shared the multimedia content, edited the multimedia content, zoomed into the multimedia content, and rotated the display to match an original orientation of the multimedia content;
  associating the behavioral cues and the interaction cues with the multimedia operation;
  ranking multimedia content with a model according to the behavioral cues and further according to the interaction cues;
  selecting a subset of the multimedia content in accordance with the ranks of the multimedia content;
  displaying the subset of the multimedia content on the display;
  requesting feedback from the user in response to displaying the subset of the multimedia content;
  classifying the feedback from the user as a positive reaction or a negative reaction to produce feedback cues; and
  selecting a further subset of the multimedia content in accordance with the feedback cues.

18. The device of claim 17, wherein the instructions for identifying the behavioral cues comprise instructions for capturing and analyzing ambient sounds to produce the behavioral cues.

19. The device of claim 17, wherein the instructions for identifying the behavioral cues comprise instructions for capturing and recognizing facial expressions of the user to produce the behavioral cues.

20. The device of claim 17, wherein the instructions for identifying the interaction cues comprise instructions for searching for photo sub-cues in the multimedia content and classifying the photo sub-cues as positive reactions or negative reactions to produce the interaction cues.

21. The device of claim 17, wherein the program further includes instructions for:

ranking the multimedia content with the model further in accordance with the feedback cues.

22. A device comprising:
a sensing device;
an input device;
a memory storing a plurality of multimedia content, the multimedia content being a photograph or a video;
a display;
a processor; and
a computer-readable storage medium storing a program to be executed by the processor, the program including instructions for:
receiving a request from a user to perform a multimedia operation, the multimedia operation comprising displaying a first subset of the multimedia content on the display;
performing the multimedia operation while receiving signals from the sensing device and the input device, and while determining whether the user views the multimedia content for a predetermined amount of time, shares the multimedia content, edits the multimedia content, zooms into the multimedia content, and rotates the display to match an original orientation of the multimedia content during the displaying of the first subset of the multimedia content on the display;
updating a recommendation of a second subset of the multimedia content in accordance with the request, the signals from the sensing device, and whether the user manipulated the first subset of the multimedia content, wherein updating the recommendation comprises:
searching for multimedia sub-cues in the signals received from the sensing device; and
classifying the multimedia sub-cues as positive reactions or negative reactions to produce interaction cues, the recommendation updated according to the interaction cues;
displaying the updated recommendation on the display;
requesting feedback from the user in response to displaying the updated recommendation;
classifying the feedback from the user as a positive reaction or a negative reaction to produce feedback cues; and
further updating the recommendation of the second subset of the multimedia content in accordance with the feedback cues.

23. The device of claim 22, wherein the instruction for retrieving data with the sensing device comprises instructions for sensing behavior of the user with the sensing device and receiving device input behavior of the user with the input device.

24. The device of claim 22, wherein the sensing device is one of a microphone or a front camera, and wherein the input device is a touchscreen.

* * * * *